US009472190B2

(12) United States Patent
Yue et al.

(10) Patent No.: US 9,472,190 B2
(45) Date of Patent: Oct. 18, 2016

(54) METHOD AND SYSTEM FOR AUTOMATIC SPEECH RECOGNITION

(71) Applicant: Tencent Technology (Shenzhen) Company Limited, Shenzhen (CN)

(72) Inventors: Shuai Yue, Shenzhen (CN); Li Lu, Shenzhen (CN); Xiang Zhang, Shenzhen (CN); Dadong Xie, Shenzhen (CN); Bo Chen, Shenzhen (CN); Feng Rao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 183 days.

(21) Appl. No.: 14/263,958

(22) Filed: Apr. 28, 2014

(65) Prior Publication Data
US 2014/0236591 A1 Aug. 21, 2014

Related U.S. Application Data

(63) Continuation of application No. PCT/CN2013/087816, filed on Nov. 26, 2013.

(30) Foreign Application Priority Data

Jan. 30, 2013 (CN) .......................... 2013 1 0037464

(51) Int. Cl.
*G10L 15/193* (2013.01)
*G10L 15/08* (2006.01)
(52) U.S. Cl.
CPC ........... *G10L 15/193* (2013.01); *G10L 15/083* (2013.01)
(58) Field of Classification Search
CPC .. G10L 15/193; G10L 15/083; G10L 15/183
See application file for complete search history.

(56) References Cited

U.S. PATENT DOCUMENTS 6,032,111 A * 2/2000 Mohri ................. G06F 17/2755
704/257
6,185,535 B1 * 2/2001 Hedin ..................... G10L 15/30
704/270

(Continued)

FOREIGN PATENT DOCUMENTS

CN 101751924 A 6/2010
CN 102376305 A 3/2012

(Continued)

OTHER PUBLICATIONS

Mohri, Mehryar, Fernando Pereira, and Michael Riley. "Speech recognition with weighted finite-state transducers." Springer Handbook of Speech Processing. Springer Berlin Heidelberg, 2008. 559-584.*

(Continued)

*Primary Examiner* — Matthew Baker
(74) *Attorney, Agent, or Firm* — Morgan, Lewis & Bockius LLP

(57) ABSTRACT

A method of recognizing speech is provided that includes generating a decoding network that includes a primary sub-network and a classification sub-network. The primary sub-network includes a classification node corresponding to the classification sub-network. The classification sub-network corresponds to a group of uncommon words. A speech input is received and decoded by instantiating a token in the primary sub-network and passing the token through the primary network. When the token reaches the classification node, the method includes transferring the token to the classification sub-network and passing the token through the classification sub-network. When the token reaches an accept node of the classification sub-network, the method includes returning a result of the token passing through the classification sub-network to the primary sub-network. The result includes one or more words in the group of uncommon words. A string corresponding to the speech input is output that includes the one or more words.

15 Claims, 22 Drawing Sheets

(56) References Cited

U.S. PATENT DOCUMENTS

| | | | | |
|---|---|---|---|---|
| 6,574,597 | B1* | 6/2003 | Mohri | G10L 15/183 704/251 |
| 6,587,844 | B1* | 7/2003 | Mohri | G10L 15/083 704/256 |
| 7,020,606 | B1* | 3/2006 | Class | G10L 15/193 704/242 |
| 7,480,612 | B2* | 1/2009 | Mori | G10L 15/193 704/1 |
| 8,112,275 | B2* | 2/2012 | Kennewick | G10L 15/22 704/240 |
| 8,374,865 | B1* | 2/2013 | Biadsy | G10L 15/183 704/243 |
| 8,442,812 | B2* | 5/2013 | Ehsani | G06F 17/2775 704/231 |
| 8,972,243 | B1* | 3/2015 | Strom | G10L 15/193 704/1 |
| 9,093,061 | B1* | 7/2015 | Secker-Walker | G10L 15/083 |
| 9,123,333 | B2* | 9/2015 | Amarilli | G10L 15/08 |
| 2004/0205671 | A1* | 10/2004 | Sukehiro | G06F 17/2735 715/259 |
| 2005/0149326 | A1 | 7/2005 | Hogengout et al. | |
| 2005/0283364 | A1* | 12/2005 | Longe | G06K 9/00422 704/257 |
| 2007/0038436 | A1* | 2/2007 | Cristo | G06F 17/273 704/9 |
| 2007/0050191 | A1* | 3/2007 | Weider | G06F 17/30864 704/275 |
| 2007/0192104 | A1* | 8/2007 | Blewett | G10L 15/28 704/256 |
| 2007/0198266 | A1* | 8/2007 | Li | G10L 15/08 704/255 |
| 2014/0149119 | A1* | 5/2014 | Sak | G06F 17/2775 704/260 |
| 2014/0303973 | A1* | 10/2014 | Amarilli | G10L 15/08 704/235 |
| 2015/0243285 | A1* | 8/2015 | Lane | G10L 15/34 704/256.1 |

FOREIGN PATENT DOCUMENTS

| | | |
|---|---|---|
| CN | 102592595 A | 7/2012 |
| CN | 103065630 A | 4/2013 |

OTHER PUBLICATIONS

McDermott, Erik, et al. "Discriminative training for large-vocabulary speech recognition using minimum classification error." Audio, Speech, and Language Processing, IEEE Transactions on 15.1 (2007): 203-223.*

Tencent Technology, ISR, PCT/CN2013/087816, Mar. 6, 2014, 5 pgs.

Tencent Technology, Written Opinion, PCT/CN2013/087816, Mar. 6, 2014, 7 pgs.

Tencent Technology, IPRP, PCT/CN2013/087816, Aug. 4, 2015, 8 pgs.

* cited by examiner

```
\data\
ngram 1=5
ngram 2=6
ngram 3=2

\1-grams:
-0.5228788   </s>
-99  <s>  -0.30103
-0.5228788   NAME      -0.30103
-0.69897     chi_le_ma   -0.3222193
-0.69897     ni_hao   -0.3222193

\2-grams:
-0.60206     <s> NAME
-0.30103     <s> ni_hao   0
-0.60206     NAME </s>
-0.30103     NAME chi_le_ma   0
-0.1760913   chi_le_ma </s>
-0.1760913   ni_hao NAME \3-grams:
-0.1760913   NAME chi_le_ma </s>
-0.1760913   <s> ni_hao NAME \end\
```

Figure 5

```
<s> sil
</s> sil
ni_hao n i3 h aa3 uu3
chi_le_ma ch ix1 l e4  m a2
```

Figure 7

METHOD AND SYSTEM FOR AUTOMATIC SPEECH RECOGNITION

RELATED APPLICATIONS

This application is a continuation application of PCT Patent Application No. PCT/CN2013/087816, entitled "METHOD AND SYSTEM FOR AUTOMATIC SPEECH RECOGNITION" filed Nov. 26, 2013, which claims priority to Chinese Patent Application No. 201310037464.5, entitled "METHOD AND SYSTEM FOR AUTOMATIC SPEECH RECOGNITION," filed Jan. 30, 2013, both of which are herein incorporated by reference in their entirety.

FIELD OF THE INVENTION

The present application relates generally to the technical field of automatic speech recognition (ASR), and specifically relates to a method and system for automatic speech recognition.

BACKGROUND OF THE INVENTION

Automatic speech recognition is an area of technology which transforms the lexical content of human speech into an input form (e.g., a character string) that can be read by computers. The process of automatic speech recognition typically includes several operations, including: generating a language model that contains a plurality of words in a corpus, training an acoustic model to create statistical representations of one or more contrastive units of sound (called "phonemes" or simply "phones") that make up each word in the corpus, building a decoding network (sometimes called a "decoding resource network) using the language model and the acoustic model, and finally decoding human speech.

FIG. 1 is a schematic diagram of a processing flow using a conventional automatic speech recognition system. In some circumstances, the processing flow is performed at a speech recognition device. Referring to FIG. 1, the processing flow includes:

Operation 101 and 102, in which an acoustic model is trained using sound samples. Similarly a language model is trained using a corpus.

The acoustic model is one of the most important aspects of a speech recognition system. Most of the mainstream speech recognition systems adopt Hidden Markov Models (HMM) to construct acoustic models. An HMM is a statistical model which is used to describe a Markov process containing a hidden parameter (e.g., a parameter that is not directly observed). In an HMM, although the hidden parameter is not directly observed, one or more variables affected by the hidden parameter are observed. In the context of speech recognition, a spoken phoneme is considered a hidden parameter, whereas acoustic data received (e.g., by a microphone of the device) is the observed variable. The corresponding probability between the spoken phoneme and the acoustic data is described in the acoustic model (e.g., the acoustic model describes the probability that acoustic data was generated by a user speaking a particular phoneme).

In some circumstances, a speech signal received by the device is expressed (e.g., represented) as a triphone. For example, such a triphone can be constructed by including a current phone as well as right and left half phones adjacent to the current phone.

The main structure of the language model is a probability distribution $p(s)$ of a character string s, reflecting the probability of the character string s appearing as a sentence. Suppose $w_i$ stands for the $i^{th}$ word in the character string s. In this case, the probability distribution $p(s)$ can be written as:

$$p(s)=p(w_1w_2w_3 \ldots w_n)=p(w_1)p(w_2|w_1)p(w_3|w_1w_2) \ldots p(wk|w_1w_2 \ldots w_{k-1})$$

Operation 103, in which a decoding resource network is constructed according to the acoustic model, language model and a presupposed dictionary. In some circumstances, the decoding resource network is a weighted finite state transducer (WFST) network.

Operation 104, in which speech is input into the decoder, the speech is decoded by the decoder according to the decoding resource network, and a character string with the highest probability value is output as the recognized result of the speech input.

FIG. 2 is a flowchart diagram of a method for constructing a decoding resource network using conventional technology. Referring to FIG. 2, the method includes: obtaining an Ngram WFST network by transforming the language model, obtaining a Lexicon-WFST by transforming the dictionary, and obtaining a Context-WFST network by transforming the acoustic model. These three WFST networks are merged, for example, by first merging the Ngram-WFST network and the Lexicon-WFST into a Lexicon-Gram-WFST network, then merging the Lexicon-Gram-WFST with the Context-WFST network. Finally the decoding resource network is obtained. In this example, the decoding resource network is a Context-Lexicon-Gram-WFST network.

However, most conventional speech recognition technology is based on a universal speech recognition application that constructs model based on common speech. In this situation, the corpus used to the train the language model is based on data collected through the actual input of users. Though the speech habits of users are well reflected in such a model, these models struggle to recognize less frequently used (e.g., obscure) words, such as personal names, medicinal names, place names, etc. This is because the probability value of the character string corresponding to the obscure words in the language model is very low. When conventional speech recognition systems need to recognize obscure words spoken by the user, they too often fail.

Thus, what is needed is speech recognition technology (e.g., methods and systems) which are more easily able to recognize the use of obscure words.

SUMMARY

To address the aforementioned problems, some implementations of the present application provide a computer-implemented method of method of recognizing speech. The method includes generating a decoding network for decoding speech input. The decoding network includes a primary sub-network and one or more classification sub-networks. The primary sub-network includes a plurality of classification nodes. Each classification node corresponds to a respective classification sub-network of the one or more classification sub-networks. Furthermore, each classification sub-network of the one or more classification sub-networks corresponds to a group of uncommon words. The method further includes receiving a speech input and decoding the speech input by instantiating a token corresponding to the speech input in the primary sub-network and passing the token through the primary network. When the token reaches a respective classification node of the plurality of classification nodes, the method includes transferring the token to the corresponding classification sub-network and passing the token through the corresponding classification sub-network. When the token reaches an accept node of the classification sub-network, the method includes returning a result of the token passing through the classification sub-network to the primary sub-network. The result includes one or more words in the group of uncommon words corresponding to the classification sub-network. Finally, the method includes outputting a string corresponding to the speech input that includes the one or more words.

In another aspect of the present application, to address the aforementioned problems, some implementations provide a non-transitory computer readable storage medium storing one or more programs. The one or more programs comprise instructions, which when executed by an electronic device with one or more processors and memory, cause the electronic device to perform any of the methods provided herein.

In yet another aspect of the present application, to address the aforementioned problems, some implementations provide an electronic device. The electronic device includes one or more processors, memory, and one or more programs. The one or more programs are stored in memory and configured to be executed by the one or more processors. The one or more programs include an operating system and instructions that when executed by the one or more processors cause the electronic device to perform any of the methods provided herein.

BRIEF DESCRIPTION OF THE DRAWINGS

For a better understanding, reference should be made to the following detailed description taken in conjunction with the accompanying drawings, in which:

FIG. 5 is an example of a content schematic diagram of a general language model, in accordance with some implementations.

FIG. 7 is a partial schematic diagram of content contained in a dictionary, in accordance with some implementations.

Like reference numerals and names refer to corresponding parts throughout the drawings.

DESCRIPTION OF EMBODIMENTS

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

Figure 3:
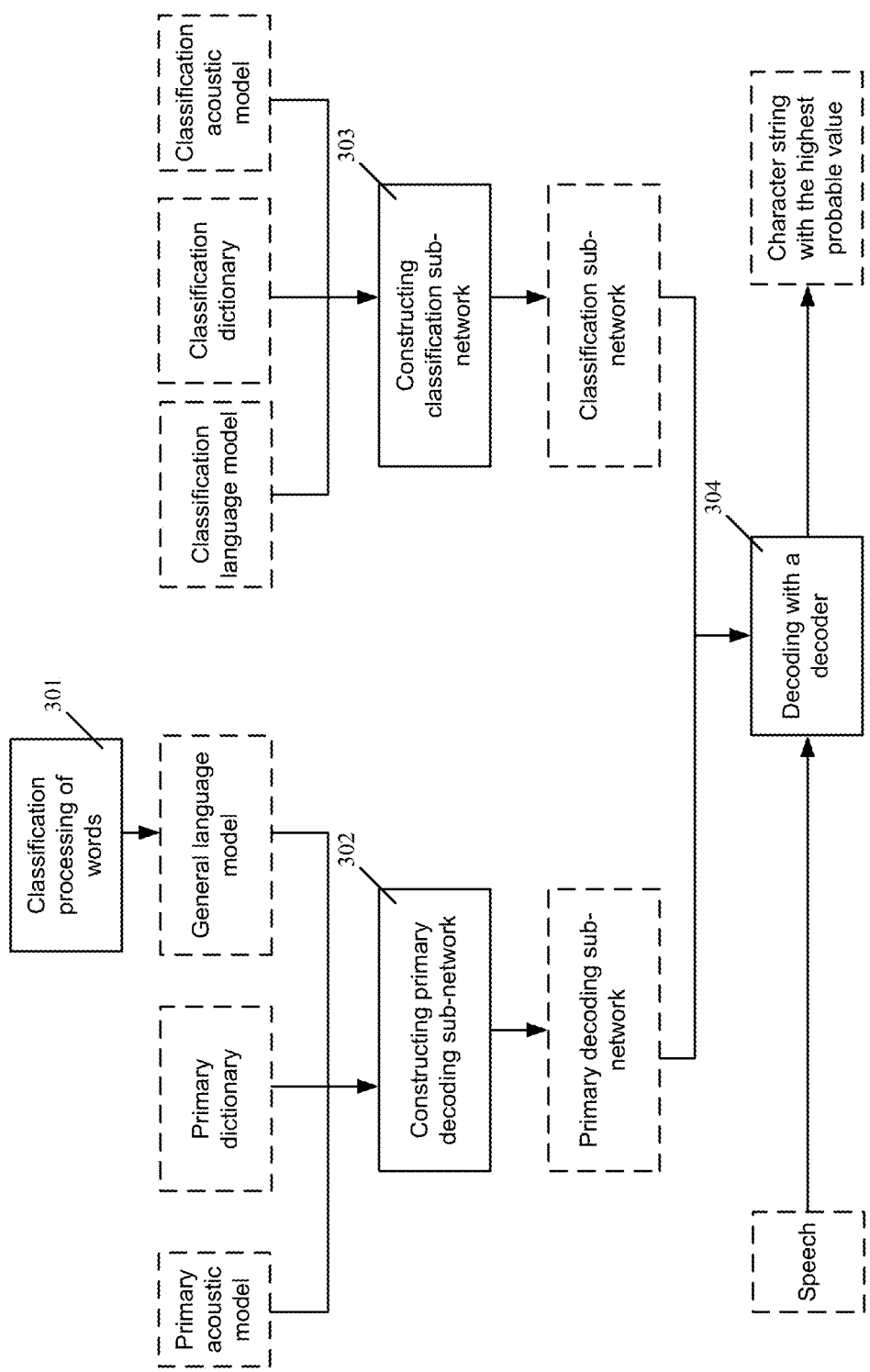
FIG. 3 is a flowchart diagram of an automatic speech recognition method, in accordance with some implementations.

FIG. 3 is a flowchart diagram of an automatic speech recognition method, in accordance with some implementations. The method includes:

Operation 301, classification processing of words. In operation 301, words are classified (e.g., as personal names, medicinal names, place names, or other classifications of words). Each classification is assigned a classification mark, and obscure words are replaced by their classification symbol.

Operation 302, construct a primary decoding sub-network. In operation 301: a primary decoding sub-network is constructed according to a speech model, a primary dictionary and a general language model. During construction of the primary decoding sub-network, classifying marked nodes (corresponding to the classification marks of operation 301) are added to the primary decoding sub-network, and the classifying marked nodes are connected with other nodes by network edges (sometimes referred to simply as "edges").

Operation 303, construct one or more classification sub-networks. In operation 303, a classification sub-networks is constructed corresponding to each classification. For each classification, there is a classification language model, a classification dictionary, and a classification acoustic model and the classification sub-network is constructed therefrom (e.g., in accordance with to the classification language model, the classification dictionary, and the classification acoustic model). Each classification sub-network is linked to the primary decoding sub-network via one or more phones as a starting position (e.g., a coda phone and a mute phone in the primary dictionary) and one or more phones as an ending position (e.g., an onset phone and a mute phone of each word in the primary dictionary).

Operation 304, decoding speech with a decoder. In some implementations, operation 304 includes decoding and recognizing a speech input according to the primary decoding sub-network. When a decoding token meets with the classifying marked nodes, operation 304 includes preserving the edge and a phone before the classifying marked node and jumping to the corresponding classification sub-network of the classifying marked node. Operation 304 further includes taking the phone before the classifying marked nodes as an index to find the starting position of the classification sub-network, then decoding and recognizing the speech input in the classification sub-network from the starting position up until and ending position is reached. Operation 304 further includes preserving the phone before the ending position, then jumping back to the edge before the classifying marked node in the primary decoding sub-network, and taking the phone before the ending position as an index to find the starting position of the subsequent decoding process. Decoding and recognition of the speech input is continued from that starting position. The decoding result is output. In some implementations, the character string with the highest probable value is output and hence is the recognized results of decoding the speech input. In some implementations, a final speech recognition results is output after further processing of the output result of decoding.

In some implementations, during operation 301, words in a raw corpus are classified so as to obtain different classifications of words. Words the corpus can be divided into classifications, such as person names, place names, computer terminology, medical terminology, etc. For example, "isatis root" may belong to the classification of medical terminology. A word may also belong to multiple classifications. However, because the amount of time spent classifying words shows an exponential growth with the number of classifications to which a word may belong, in some implementations words are classified according to, at most, one classification. In some implementations, a respective word is classified in accordance with a probability that the respective word belongs to a respective classification, e.g., in accordance with max(p(w|Ci)), in which w indicates the respective word, and Ci indicates a respective classification. In some implementations, commonly used words are not classified (e.g., classification of commonly used words is forgone).

As shown in Table 1, the left half of Table 1 is the general language model before replacement, among which "isatis root" and "pseudo ginseng" belong to a classification of obscure medical terminology having a corresponding classifying mark is C1. "Andy Liu" belongs to a classification of obscure person names having a corresponding classifying mark is C2. The right half of Table 1 is the general language model after replacement, in which the obscure words in the obscure medical terminology and obscure names classifications have been replaced with their respective classifying mark. In some implementations, a rollback probability of each obscure word in such classifications is calculated. When decoding, in case that the token encounters multiple classifying mark nodes, the decoder enters the classification sub-network corresponding to a classifying mark that has a rollback probability exceeding a predetermined threshold value.

TABLE 1

| ngram 1 = 5 | ngram 1 = 5 |
| ngram 2 = 8 | ngram 2 = 8 |
| ngram 3 = 7 | ngram 3 = 7 |
| \1-grams | \1-grams |
| −0.415 </s> | −0.415 </s> |
| −99 <s> −1.9 | −99 <s> −1.9 |
| −0.6356 isatis root −3.42 | −0.6356 C1 −3.42 |
| −0.434 pseudo ginseng −3.24 | −0.434 C1 −3.24 |
| −0.11 you −1.23 | −0.11 you −1.23 |
| −0.2 Andy Liu −2.1 | −0.2 C2 −2.1 |
| \2-grams | \2-grams |
| −0.42 good day −3.42 | −0.42 good day −3.42 |
| −0.3 isatis root good −2.3 | −0.3 C1 good −2.3 |

In some implementations, during construction of classification sub-networks in the Operation 303, classification sub-networks are linked to the primary decoding sub-network by in one of several ways. For example, in some implementations, classification sub-networks are linked to the primary decoding sub-network by taking the last two monophones of each phrase in the primary decoding sub-network as the starting position. Or, for example, when linking a classification sub-network to a monophone word (e.g., "an") in the primary decoding sub-network, a mute phone plus the phone of the monophone word (or, alternatively, just the mute phone) is taken as the starting position. In some implementations, two onset monophones of each phrase in the primary decoding sub-network are taken as an ending position. In some circumstances, the phone of a monophone word plus a mute are taken as the ending position (or, alternatively, just the mute phone).

In some implementations, operation 304 includes decoding and recognizing the speech input according to the primary decoding sub-network. When a decoding token meets with a classifying marked node, the edge of the primary decoding sub-network is preserved along with one or two phone before the classifying marked node. The token jumps to the corresponding classification sub-network of the classifying marked node. Operation 304 then includes taking the one or two phones before the classifying marked nodes as an index to find a starting position of the classification sub-network and decoding (e.g., recognizing) the speech input in the classification sub-network from that staring position up until the ending position. Operation 304 then includes preserving one or two phones before the ending position and jumping back to the edge before the classifying marked node in the primary decoding sub-network. Operation 304 then includes taking one or two phones before the ending position as an index to find the starting position for subsequent decoding, and continuing to decode and recognize the speech input from that starting position. Operation 304 further includes outputting the decoding results, which, in some implementations, entails, outputting a character string with the highest probable value as the recognized results of the speech input. In some implementations, a final recognized result is output after further processing.

Attention is now directed to construction of the primary decoding sub-network and the classification sub-network, respectively.

Figure 4:
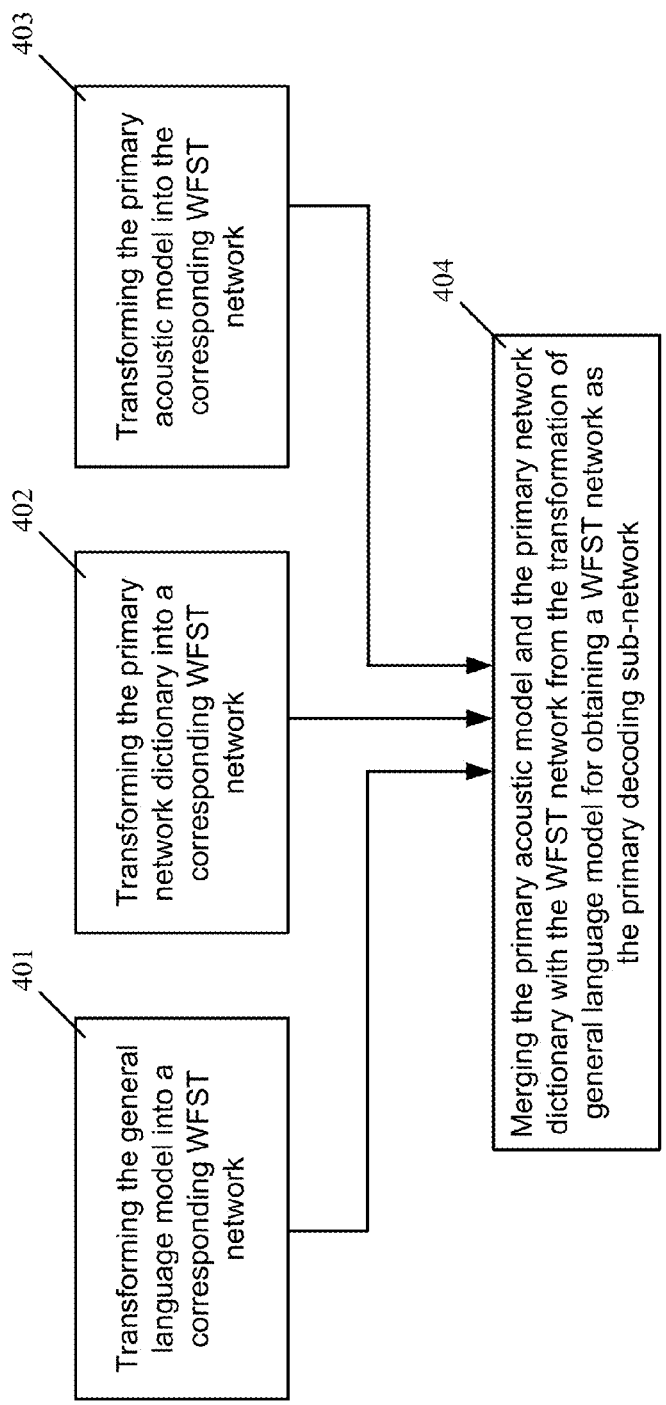
FIG. 4 is a flowchart diagram of a method for constructing a primary decoding sub-network, in accordance with some implementations.

FIG. 4 is a flowchart diagram of a method for constructing the primary decoding sub-network, in accordance with some implementations. Referring to FIG. 4, the flowchart diagram includes:

Operation 401, transform the general language model into a corresponding WFST network.

Figure 6A:
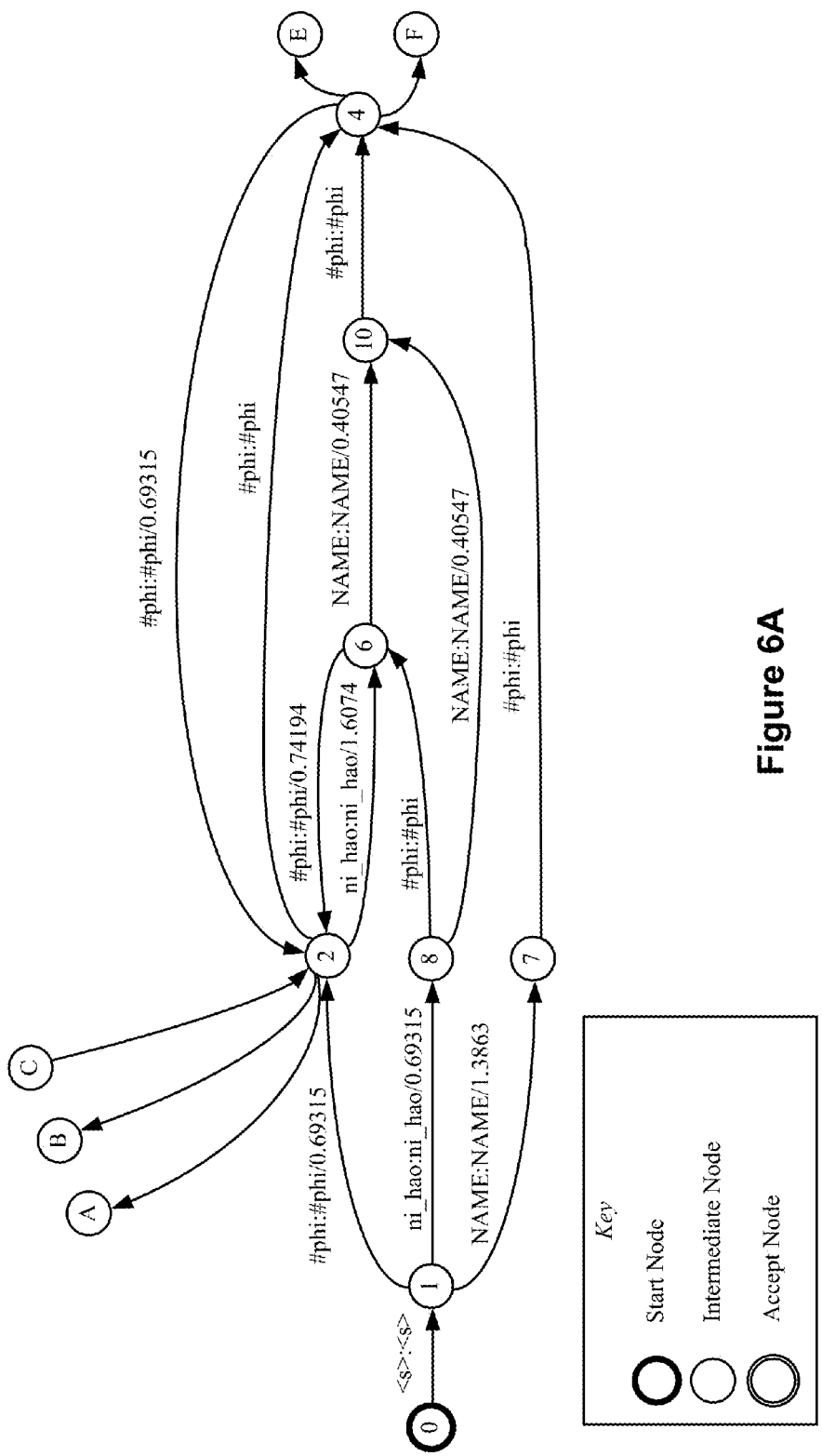
FIGS. 6A and 6B are partial schematic diagrams of a transformation from the general language model shown in FIG. 5 into an Ngram-WFST network.
Figure 6B:
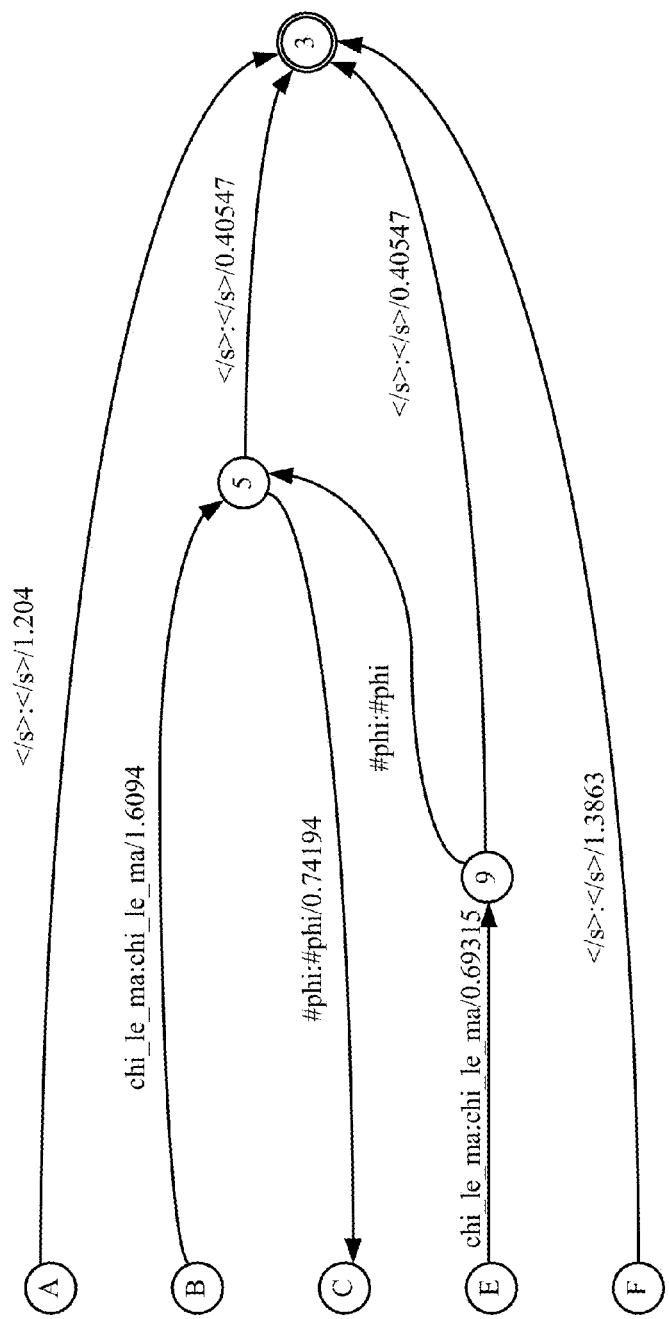

FIG. 5 is an example of a content schematic diagram of a general language model, in accordance with some implementations. FIGS. 6A and 6B are partial schematic diagrams of a transformation from the general language model shown in FIG. 5 into an Ngram-WFST network. Because the Ngram-WFST network is complex, only part of it is shown. Referring to FIG. 5 and FIGS. 6A and 6B, the general language model and the Ngram-WFST include the character strings of "ni," "hao," "ni hao NAME," etc. and a probability value corresponding to each character string. As shown in FIG. 5, "NAME" is the classifying mark of a person name classification. (Note on translation: "Ni hao" is a Chinese greeting akin to "Hello" in English, "Chi le ma" translates roughly to "Have you eaten?" or, in more colloquial usage, "How are you?") The symbol <s> refers to a starting mute phone, </s> refers to an ending mute phone. The symbol #phi indicates a non-labeled edge, meaning that a token is passed from one node to another node via a non-labeled edge without the addition of any recognized speech output. The transformation from the general language model into the corresponding WFST network in the present application can be realizing using conventional transformation methods which are known in the art. Using these, relevant syntactic structure can also be transformed into the corresponding WFST.

Referring again to FIG. 4, the flowchart diagram includes operation 402: transform the primary dictionary into a corresponding WFST network. In some implementations, operating 402 includes adding an edge corresponding to the classifying marks between a starting symbol and an ending symbol, and marking the input and output symbols of the corresponding edges according to the classification.

Figure 8A:
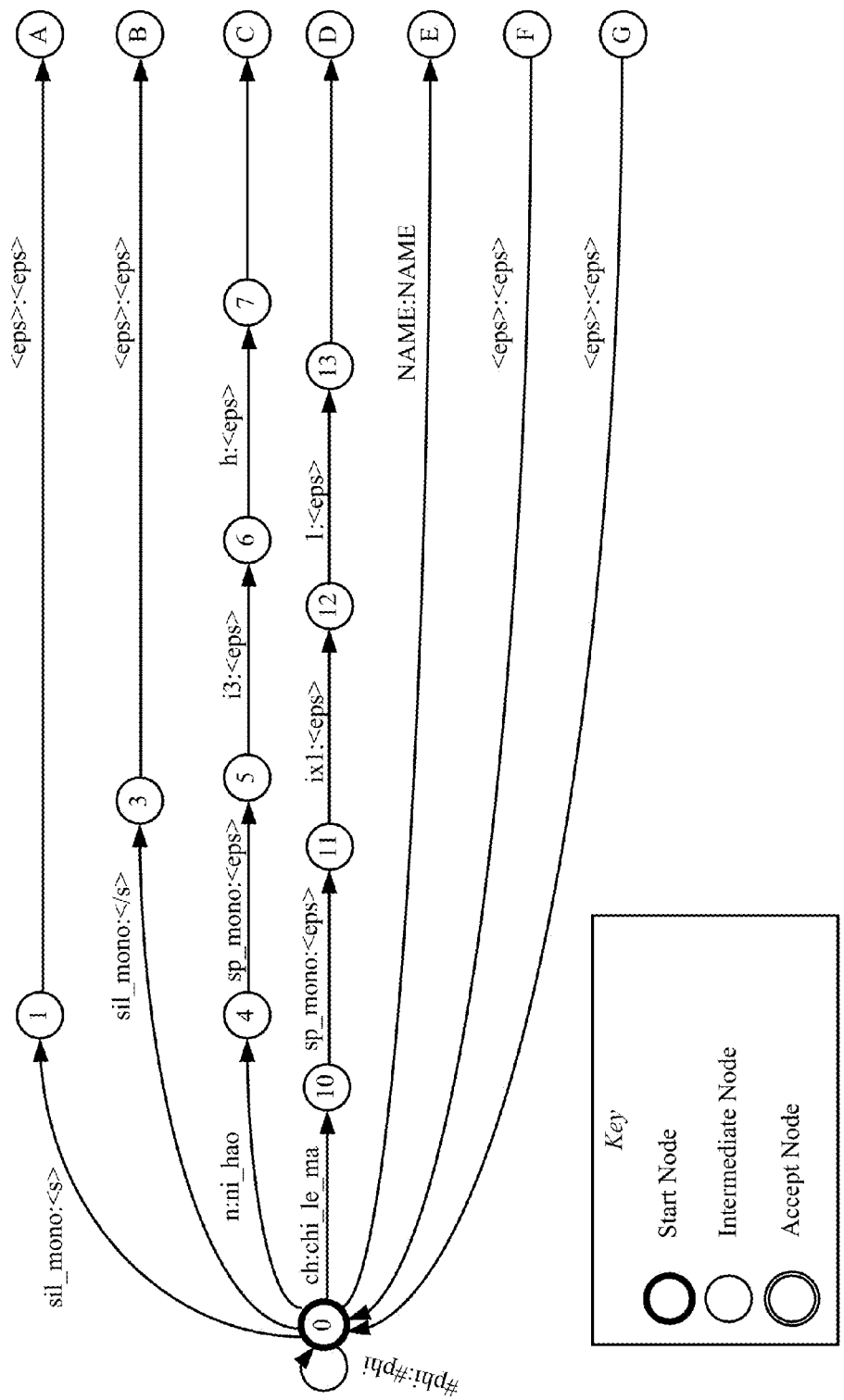
FIGS. 8A and 8B are partial schematic diagrams of a transformation from the dictionary content in FIG. 7 into a Lexicon-WFST network.
Figure 8B:
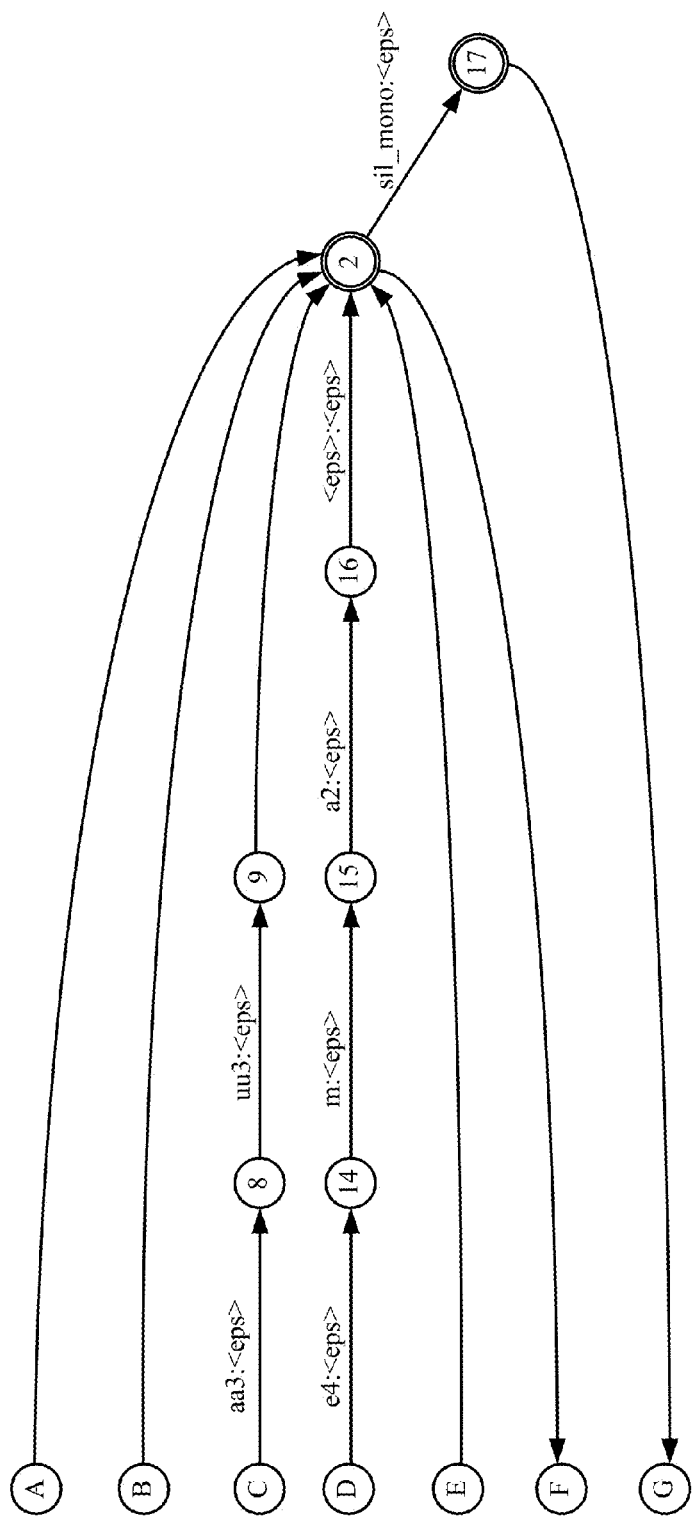

FIG. 7 is a partial schematic diagram of content contained in a dictionary, in accordance with some implementations. FIG. 7 shows symbols on the left (e.g., <s>, </s> "ni_hao," and "chi_le_ma") corresponding to dictionary entries. To the right of each symbol is a corresponding phonetic notation (e.g., "sil" the phonetic notation for the mute symbol while "ch," "ix1" "l " "e4" "m" "a2" each represent phonetic sounds in the Chinese language). FIGS. 8A and 8B are partial schematic diagrams of a transformation from the dictionary content in FIG. 7 into a Lexicon-WFST network.

Referring to FIGS. 8A and 8B, each edge in the Lexicon-WFST network has an input and an output symbol (e.g., an input label and an output label). In the WFST network corresponding to the primary dictionary, the classifying mark "NAME" is the same with every word, with its individual edge. However, both input and output symbols of its corresponding edge are such classifying mark, in which, the input label is not the sequence of monophone, but it is just the same classifying mark "NAME" with its output label.

Operation 403, transform the speech model into corresponding WFST network. During the process of transformation of WFST network, the difference of the present application lies in that for each phone double nodes (each phone double nodes consists of two sequential monophones), edge pointing to each classifying marked node is required to be indicated, among which, input and output symbols of edge pointing to each classifying marked node are classifying marks; two sequential edges after the each classifying marked node: taking monophone as edge of input and output symbols.

Figure 9:
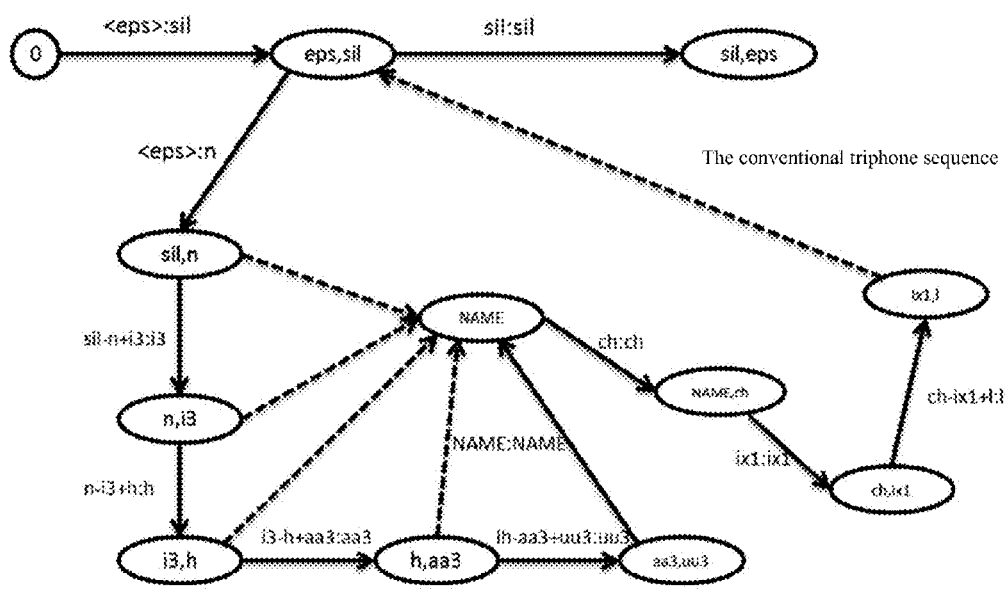
FIG. 9 is a partial schematic diagram of a transformation from an acoustic model into a Content-WFST network, in accordance with some implementations.

For example, FIG. 9 serves as a partial schematic diagram of a WFST network from the transformation of a speech model. In the present application, WFST network, corresponding to the speech model, transformed by the adoption of the conventional approach can be utilized, but the difference lies in the requirement for the additional introduction of classifying marked edge during transformation, that is: the node corresponding to each phone, as (sil, n), (n, i3), (i3, h), (h, aa3) and (aa3, uu3) shown in the figure, will lead a classifying marked edge to the corresponding classifying marked node (NAME), and all of input and output symbols of this edge are classifying label NAME; then leading an edge from classifying marked node (NAME) to any possible node such as (NAME, ch), phone ch acting not only as input label of this edge, but also output label of this edge, that is to say, this edge uses monophone ch as its input and output symbols; for the next edge after the node (NAME, ch), for example, leading an edge from the node (NAME, ch) to (ch, ix1), both input label and output label are monophone ix1, namely, this edge serves as an edge using monophone ix1 as input and output symbols. When the process is completed, lead classifying mark in classifying language model of type of NAME to WFST network.

Operation 404, merge the speech model, primary dictionary with WFST network from the transformation of language model, and the merging process includes WFST Compose, determinize and other operations for obtaining a WFST network as the primary decoding sub-network.

Naturally, it is not necessary to limit the order of operations of 401, 402, 403, and other orders are acceptable, or simultaneous performance is allowed. Naturally, at first, the language model can merge with WFST network corresponding to primary dictionary, after that, it can merge with WFST network corresponding to the speech model.

Figure 10:
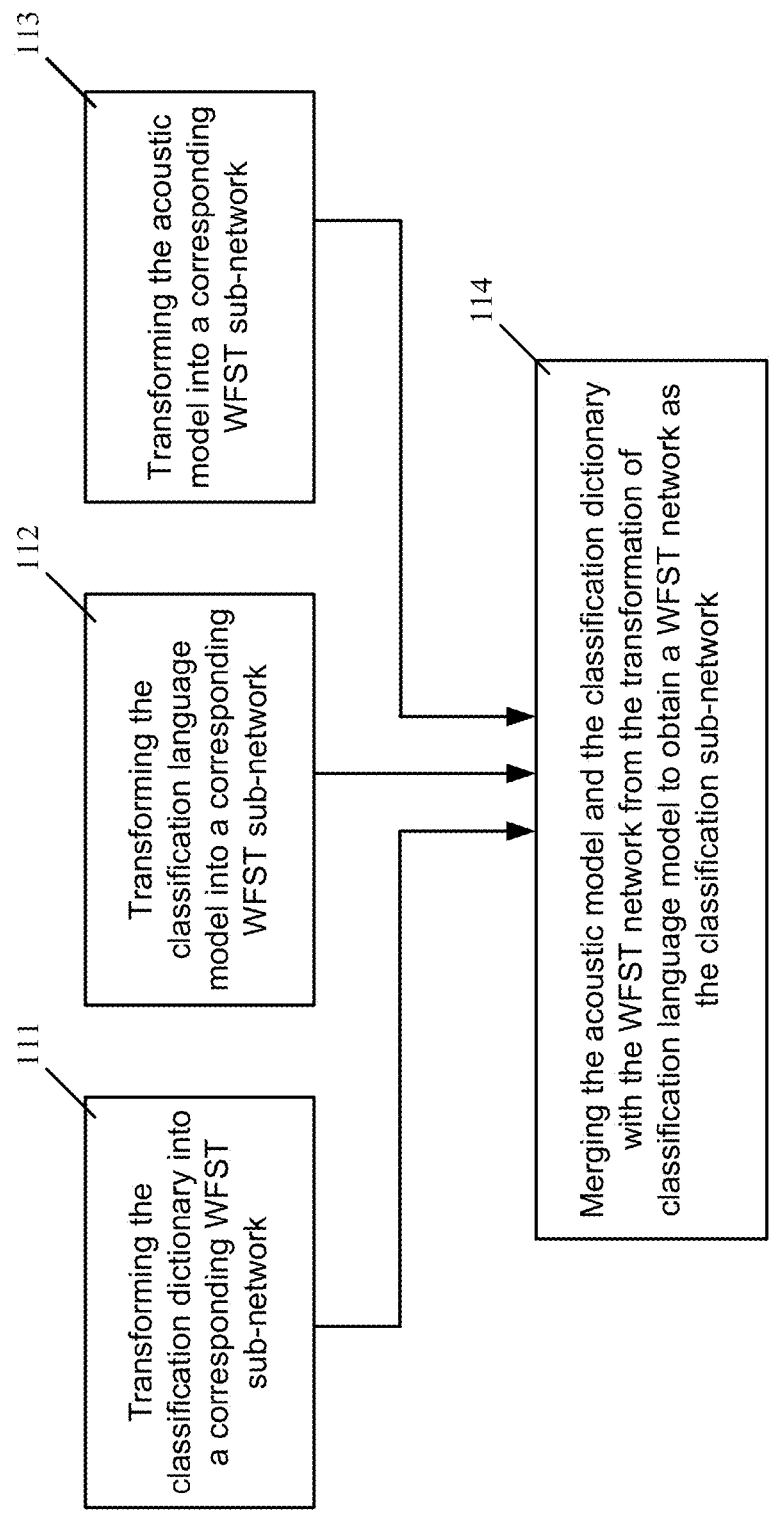
FIG. 10 is a flowchart diagram of a method for constructing a classification sub-network, in accordance with some implementations.

FIG. 10 is a flowchart diagram showing a specific method of constructing classification sub-network. Based on the speech model, primary dictionary, sub network dictionary and the classifying language model of each classification, construct each classification sub-network corresponding to each classifying language model, among which, perform the flow in FIG. 10 for each classification, including:

Operation 111, transform classifying language model of the classification into corresponding sub WFST network. This process is the same with the process of transforming the current language model into WFST network, among which, corresponding syntactic structure also can be transformed into the corresponding WFST.

Operation 112, transform the sub network dictionary into corresponding sub WFST network, and in this process, the corresponding path of words in sub network dictionary is the same as the conventional WFST transforming ways of the dictionary. However in the present application, among the phonetic symbol corresponding to start symbol, as shown in FIG. 7, except original mute (identified by symbol <s>, corresponding phonetic notation is sil), it also includes further: in the primary dictionary, phone pairs consisting of the last two phones of each word, phone pairs consisting of phones of each monophonemic word and the last one phone of each of other words, combination of mute and phones of each monophonemic word. Phonetic symbol corresponding to end symbol, except original mute (identified by symbol </s>, corresponding phonetic notation is sil), also includes further: in the primary dictionary, phone pairs consisting of the first two phones of each word, phone pairs consisting of phones of each monophonemic word and one phone at the beginning of each of other words, and combination of mute and phones of each monophonemic word.

In this way, it enables to correspond to its corresponding content of primary dictionary in starting and ending positions.

Operation 113, transform the speech model into corresponding sub WFST network. For example, FIG. 11 serves as a kind of partial schematic diagram of sub WFST network from the transformation of a kind of speech model. In the present application, sub WFST network, corresponding to the speech model, transformed by the adoption of the conventional approach, can be utilized, but the difference is that during the process of transformation, for link therein: taking two sequential edges consisting of the last two monophones of each word in primary dictionary and with monophone as input and output symbols as the starting position, or taking edge with mute as input and output symbols linking up edge with phone of each monophonemic word in primary dictionary as input and output symbols as the starting position, or taking edge with mute as input and output symbols as the starting position; taking two sequential edges consisting of the first two monophones of each word in primary dictionary and with monophone as input and output symbols as the ending position, or taking edge with phone of each monophonemic word in primary dictionary as input and output symbols linking up edge with mute as input and output symbols as the ending position, or taking edge with mute as input and output symbols as the ending position.

When constructing primary decoding sub-network, there is only one edge leading to (eps, sil) from starting node, while for the constructing of classification sub-network, there is one (mute edge) or two edges (one is mute edge, another is edge with monophone as input and output symbols) from starting node to pronunciation node so that it can be linked up in the corresponding position.

Figure 11:
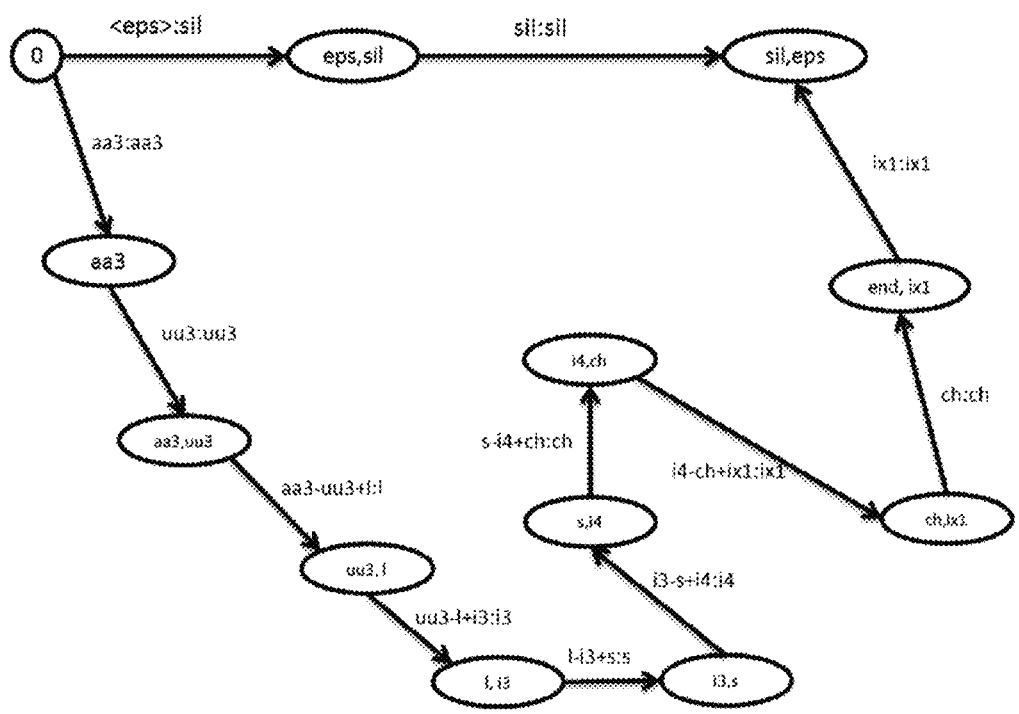
FIG. 11 is a partial schematic diagram of a transformation from an acoustic model into a Content-WFST network, in accordance with some implementations.

For example, FIG. 11 is a schematic diagram of transformation from a speech model into portion of a WFST network. In particular, FIG. 11 which shows a portion of the WFST network that outputs the phrase "Ni hao, Lisi, chi le ma?" (Note: "Ni hao" is a Chinese greeting akin to "Hello" in English, "Chi le ma" translate to "Have you had your dinner?" or, in more colloquial usage, "How are you?" while "Lisi" is a name) In which, "Lisi," as a kind of link, the starting position of the link taking edge of two sequential monophones input and output symbols consisting of pronunciations (aa3 and uu3) of last two monophones of the word "hao" as the starting position, that is, at first, it is the edge with monophone as input and output symbols (both input symbol and output symbol of the edge are aa3), then it is followed by an edge with monophone as input and output symbols (both input symbol and output symbol of the edge are uu3). In the ending position, taking the two sequential edges consisting of the first two monophones (ch and ix1) of the word "chi" and with monophone as input and output symbols as the ending position, namely, phone pairs (ch, ix1) of the node "chi" is followed by an edge with monophone ch as input and output symbols (both input symbol and output symbol of the edge are ch), then followed by an edge with monophone ix1 as input and output symbols (both input symbol and output symbol of the edge are ix1), the two sequential edges with monophone as input and output symbols indicate the arrival at end point of the link, demanding for jumping out of classification sub-network.

Operation 114, merge the speech model, sub network dictionary with WFST network from the transformation of language model of the classification for obtaining a WFST network as the classification sub-network corresponding to the classification.

Naturally, it is not necessary to limit the order of operations of 111, 112, 113, and other orders are acceptable, or simultaneous performance is allowed. Naturally, at first, the language model can merge with sub WFST network corresponding to sub network dictionary, after that, it can merge with sub WFST network corresponding to the speech model.

Figure 12:
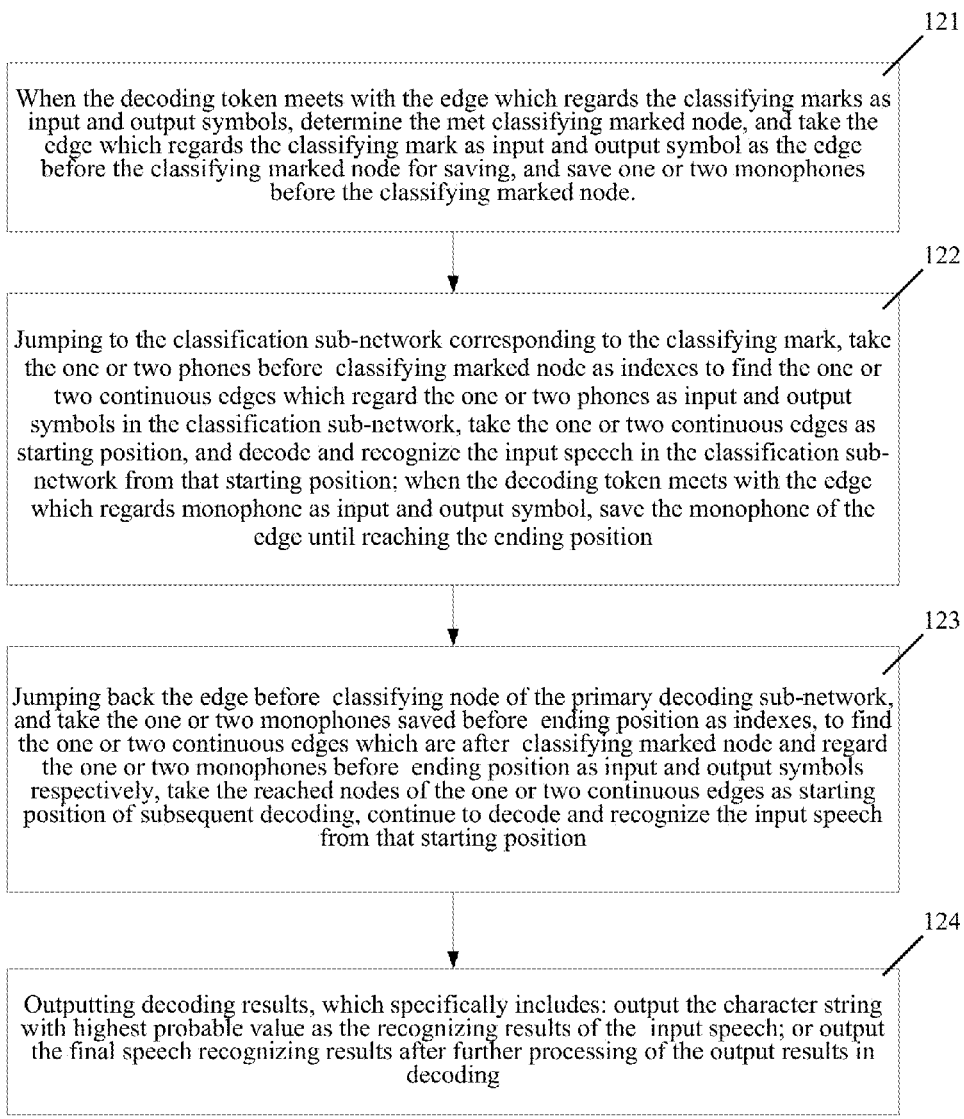
FIG. 12 is a flowchart diagram of a decoding process, in accordance with some implementations.

FIG. 12 is a specific embodiment flowchart diagram of the decoding process in the present application, refer to FIG. 12, and the flow includes in detail:

Operation 121, decoding and recognizing the speech input is performed according to the primary decoding sub-network, when the decoding token meets with the edge which regards the classifying marks as input and output symbols, determine the met classifying marked node, and take the edge which regards the classifying mark as input and output symbol as the edge before the classifying marked node for saving, and save one or two monophones before the classifying marked node. The situation of one phone refers to sil as phone of mute.

Operation 122, jumping to the classifying classification sub-network corresponding to the classifying mark, taking one or two phones before classifying marked node as indexes to find the one or two continuous edges which regard the one or two phones as input and output symbols in the classification sub-network, take the one or two continuous edges as starting position, and decoding and recognize the speech input in classification sub-network from that starting position; when the decoding token meets with the edge which regards monophone as input and output symbols, saving the monophone of the edge until reaching the ending position.

Operation 123, jumping back to the edge before classifying node of the primary decoding sub-network, and take the one or two monophones saved before ending position as indexes to find the one or two continuous edges after classifying marked node which regard the one or two monophones before ending position as input and output symbols respectively, take the reached nodes of the one or two continuous edges as starting position of subsequent decoding, continue to decode and recognize the speech input from that starting position.

Operation 124, output decoding results, which specifically includes: output the character string with highest probable value as the recognizing results of the speech input; or output the final speech recognizing results after further processing of the output results in decoding.

For example, the following content is about the specific process of decoding by decoder when user inputs speech "ni hao, Lisi, chi le ma?".

Herein, as WFST network merging with language model and dictionary is over complicated, this example only takes WFST corresponding to speech model as model for demonstration. For example, decoder can use WFST network shown in the FIG. 9 and sub WFST network in FIG. 11 to decoding, and the specific process of decoding is as follows:

At first, it begins with 0 node of primary decoding sub-network shown in FIG. 9, decoding token through edge with blank (<eps>) input label is transferred to sil −n+i3, after the matching with this triphones is done, it is transferred to n−i3+h, and finally reaching node (aa3, uu3), and herein, it meets special edge with its input label as classifying mark NAME, and it therefore saves on-site information, the on-site information including output on this special edge and its former two edges, namely, two monophones aa3 and uu3. Then jump to classification sub-network in FIG. 11, using the saved front monophone (namely aa3, uu3) in on-site information to find corresponding starting and ending positions (that is edge in sub network with monophone aa3 as input and output symbols, and edge with monophone uu3 as input and output symbols, after that start to spread from node (aa3, uu3). When decoding token meets node (ch, ix1), it will also come across edge with monophone as input label (namely, edge with monophone ch as input and output symbols), and at the moment, save this monophone ch followed by spreading downwards, if meeting edge with monophone as input label (namely, edge with monophone ix1 as input and output symbols), monophone ix1 shall be saved once again, and now it reaches terminal node of classification sub-network, jumping to the edge of saved on-site primary decoding sub-network (namely, the edge with the classifying label NAME as input and output symbols), and finding the edge of the two phones (namely, ch, ix1) satisfying the requirement of saving, and reaching node (ch, ix1), decoding of remaining part starting from this node again, decoding "ni hao, Lisi, chi le ma" is completed until speech comes to an end. Herein, Lisi can also be replaced with any other name, and however it has no effect on primary decoding sub-network. Due to primary decoding sub-network is extremely enormous, the disadvantage can also be avoided of the modification of hot word must accompanying modification of primary decoding sub-network, which saves time of modifying primary decoding sub-network (one or two days generally), and also improves accuracy rate of recognition of speech of obscure words.

Corresponding to the aforementioned method, the present application has also published the speech recognition system to implement the aforementioned method.

Figure 13:
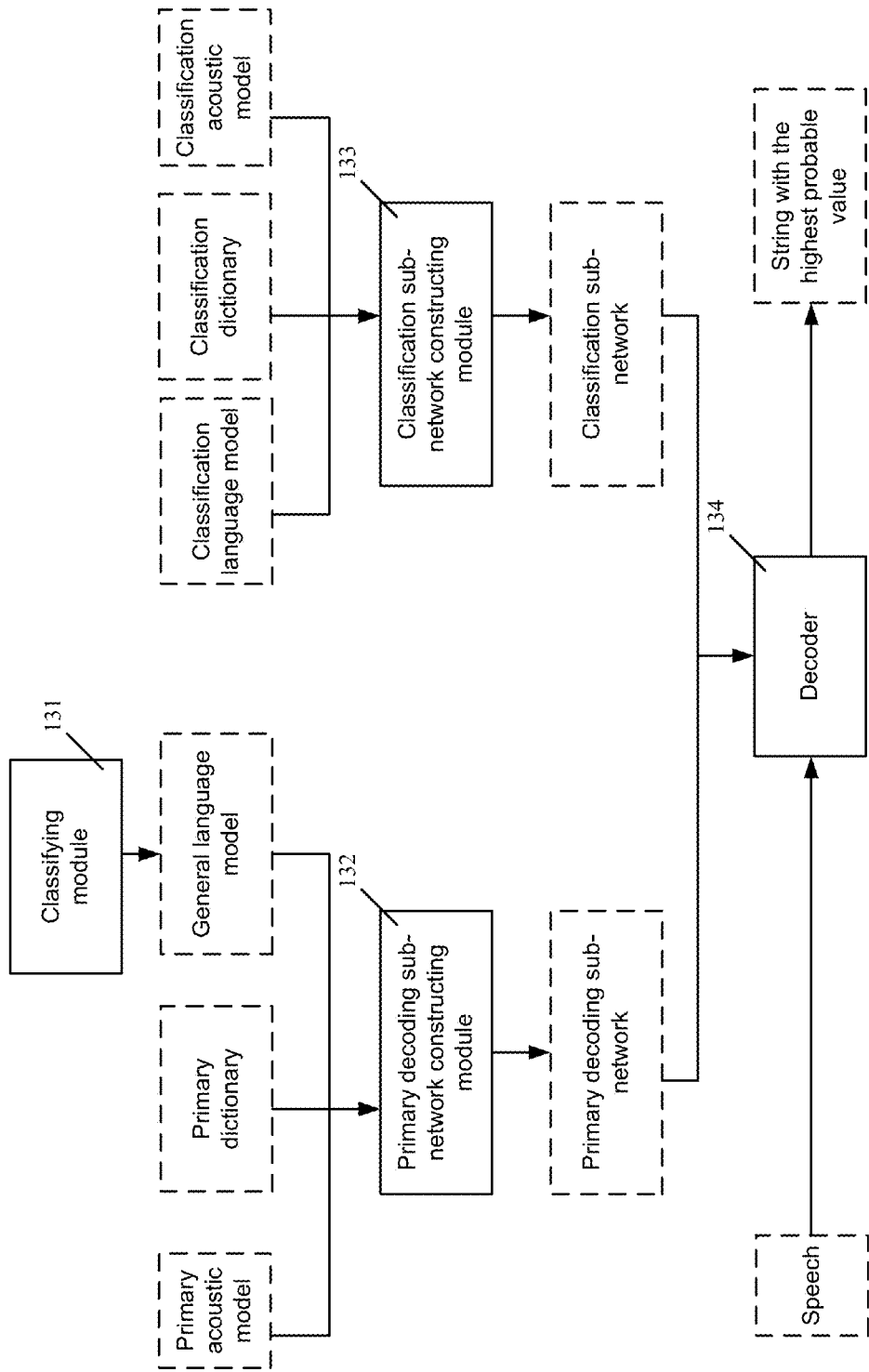
FIG. 13 is a schematic diagram of a speech recognition system, in accordance with some implementations.

The FIG. 13 is a composition schematic diagram of a certain speech recognition system in the present application. Refer to FIG. 13, the system includes:

Classification module 131 is for the classification of words, to replace the obscure words in the general language model with their classifying marks;

Primary network constructing module 132 is for constructing the primary decoding sub-network according to the speech model, primary dictionary and general language model; during constructing the primary decoding sub-network, add classifying marked nodes in the primary decoding sub-network, and connect the classifying marked nodes with other nodes by the edges;

Sub network constructing module 133 is for constructing the classification sub-network corresponding to each classifying language model according to the speech model, primary dictionary, sub network dictionary and the classifying language model of each classification; during constructing each classification sub-network, for the links of classification sub-network, take the coda phone or mute of each word in the primary dictionary as the starting position, and the onset phone or mute of each word in the primary dictionary as the ending position;

Decoder 134 is for decoding and recognizing the speech input according to the primary decoding sub-network, when the decoding token meets with the classifying marked nodes, save the edge and phone before the classifying marked node and jump to the corresponding classification sub-network of the classifying marked node; take the phone before the classifying marked nodes as indexes to find the starting position of the classification sub-network, then decode and recognize the speech input in classification sub-network from that staring position up until the ending position, and save the phone before the ending position; then jump back the edge before the classifying marked node in the primary decoding sub-network, and take the phone before the ending position as indexes to find the starting position of the subsequent decoding, and continue to decode and recognize the speech input from that starting position; output the decoding results, which include: output the character string with highest probable value as the recognizing results of the speech input; or output the final speech recognizing results after further processing of the output results in decoding.

In an embodiment, the sub network constructing module can be used specifically for: constructing the classification sub-network corresponding to each classifying language model according to the speech model, primary dictionary, sub network dictionary and the classifying language model of each classification; during constructing each classification sub-network, for the links of classification sub-network, take the last two monophonemic of each phrase in the primary dictionary, or the mute plus the phone of monophonemic word in the primary dictionary, or the mute as the starting position, and take the two onset monophone of each phrase in the primary dictionary, or the phone of monophonemic word in the primary dictionary plus mute, or the mute as the ending position;

In the embodiment, the decoder can be used specifically for: decoding and recognizing the speech input according to the primary decoding sub-network, when the decoding token meets with the classifying marked nodes, save the edge and one or two phones before the classifying marked node and jump to the corresponding classification sub-network of the classifying mark; take the one or two phones before the classifying marked nodes as indexes to find the starting position of the classification sub-network, then decode and recognize the speech input in classification sub-network from that staring position up until the ending position, and save the one or two phones before the ending position; then jump back the edge before the classifying marked node in the primary decoding sub-network, and take the one or two phones before the ending position as indexes to find the starting position of the subsequent decoding, and continue to decode and recognize the speech input from that starting position; output the decoding results; output the decoding results, which include: output the character string with highest probable value as the recognizing results of the speech input; or output the final speech recognizing results after further processing of the output results in decoding.

Figure 14:
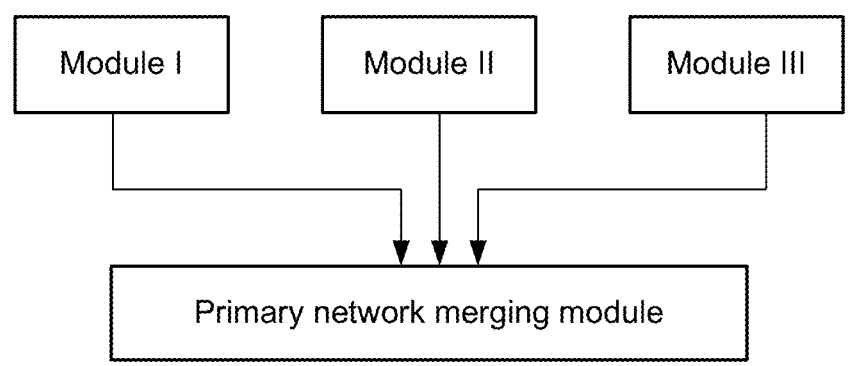
FIG. 14 is a schematic diagram of a primary network constructing module, in accordance with some implementations.

FIG. 14 is a composition schematic diagram of the primary network constructing module. Refer to FIG. 14, the primary network constructing module specifically includes:

Module I is for transforming the general language model into the corresponding WFST network;

Module II is for transforming the primary dictionary into corresponding WFST network, in which, add the corresponding edge of classifying marks between the starting symbol and ending symbol, and the input and output symbols of the corresponding edges of classifying marks shall all be marked in classification;

Module III is for transforming the speech model into corresponding WFST network, in which, for each phone double nodes, the edge pointing to each classifying marked node is indicted, among which, the input and output symbols of edge pointing to each classifying marked node are the classifying marks; two contiguous edges after the each classifying marked node: considering monophone as edge of input and output symbols;

The primary network merging module is for merging the language model, primary dictionary with WFST network from the transformation of speech model for obtaining a WFST network as the primary decoding sub-network.

Figure 15:
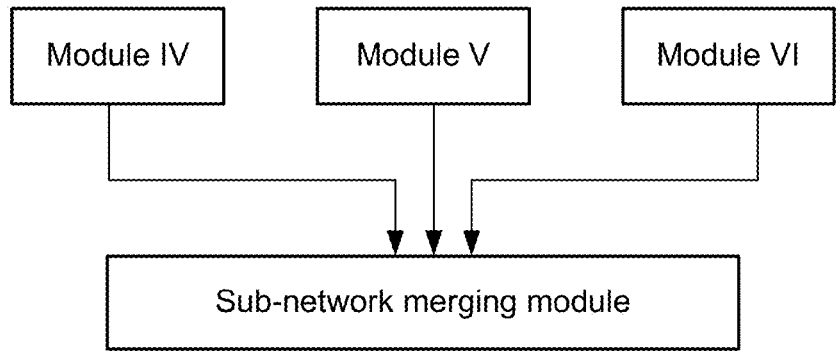
FIG. 15 is a schematic diagram of a sub-network constructing module, in accordance with some implementations.

FIG. 15 is a composition schematic diagram of the sub network constructing module. Refer to FIG. 15, the sub network constructing module specifically includes:

Module IV is for transforming the classifying language model of the classification into corresponding sub WFST network;

Module V is for transforming the sub network dictionary into corresponding sub WFST network, in this process, the corresponding path of words in sub network dictionary is the same as the WFST transforming ways of the conventional dictionary. However, in the present application, among the phonetic symbol corresponding to start symbol, as shown in FIG. 7, except original mute (identified by symbol <s>, corresponding phonetic notation is sil), it also includes further: in the primary dictionary, phone pairs consisting of the last two phones of each word, phone pairs consisting of phones of each monophonemic word and one phone at the end of each of other words, and combination of mute and phones of each monophonemic word. Phonetic symbol corresponding to end symbol, except original mute (identified by symbol </s>, corresponding phonetic notation is sil), also includes further: in the primary dictionary, phone pairs consisting of the first two phones of each word, phone pairs consisting of phones of each monophonemic word and one phone at the beginning of each of other words, and combination of mute and phones of each monophonemic word.

Module VI is for transforming the speech model into corresponding sub WFST network, for its links: take the two sequential edges which regard the monophone as input and output symbols and consist of the last two monophones of each word in the primary dictionary as starting position, or take the connection of the edge which regards mute as input and output symbols and the edge which regards the phone of each monophonemic word in primary dictionary as input and output symbols as the starting position, or take the edge which regards mute as input and output as starting position; take the two sequential edges which regard monophones as input and output symbols and consist of the first two monophones of each word in primary dictionary as ending position, take the connection of the edge which regards the phone of each monophonemic word in primary dictionary as input and output symbols and the edge which regards mute as input and output symbols as the ending position, or take the edge which regards mute as input and output symbols as ending position;

The sub network merging module is for merging the speech model, sub network dictionary with WFST network from the transformation of language model of the classification for obtaining a WFST network as the classification sub-network corresponding to the classification.

Figure 16:
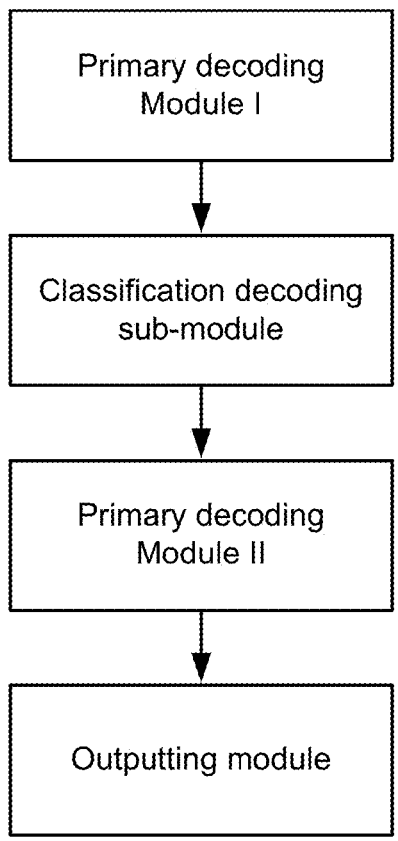
FIG. 16 is a schematic diagram of a decoder, in accordance with some implementations.

FIG. 16 is a composition schematic diagram of decoder of the present application. Refer to FIG. 16, the decoder specifically includes:

Primary decoding module I is for decoding and recognizing the speech input according to the primary decoding sub-network, when the decoding token meets with the edge which regards the classifying marks as input and output symbols, determine the met classifying marked node, and take the edge which regards the classifying mark as input and output symbol as the edge before the classifying marked node for preserving, and save the two monophones before the classifying marked node;

Sub decoding module is for jumping to the classifying classification sub-network corresponding to the classifying mark, take the one or two phones before classifying marked node as indexes to find the one or two sequential edges which regard the one or two phones as input and output symbols in the classification sub-network, take the one or two sequential edges as starting position, and decode and recognize the speech input in classification sub-network from that starting position; when the decoding token meets with the edge which regards monophone as input and output symbol, save the monophone of the edge until reaching the ending position;

Primary decoding module II is for jumping back the edge before classifying marked node of the primary decoding sub-network, and take the one or two monophones saved before ending position as indexes, to find the one or two sequential edges which are after classifying marked node and regard the one or two monophones before ending position as input and output symbols respectively, take the reached nodes of the one or two sequential edges as starting position of subsequent decoding, continue to decode and recognize the speech input from that starting position;

Outputting module is for outputting decoding results, which specifically includes: output the character string with highest probable value as the recognizing results of the speech input; or output the final speech recognizing results after further processing of the output results in decoding.

Figure 17A:
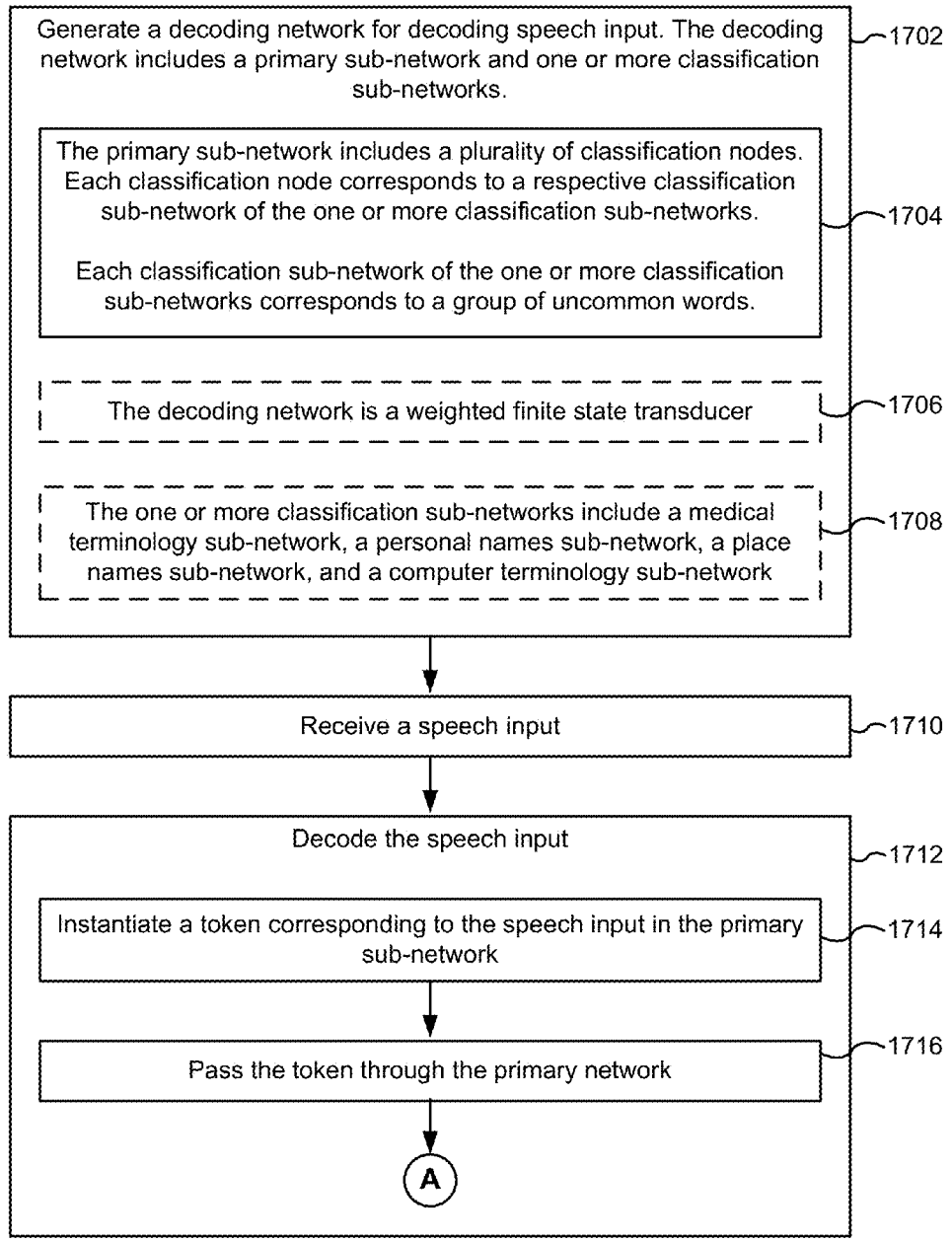
FIGS. 17A and 17B are schematic flowcharts of a method for recognizing speech commands, in accordance with some implementations.
Figure 17B:
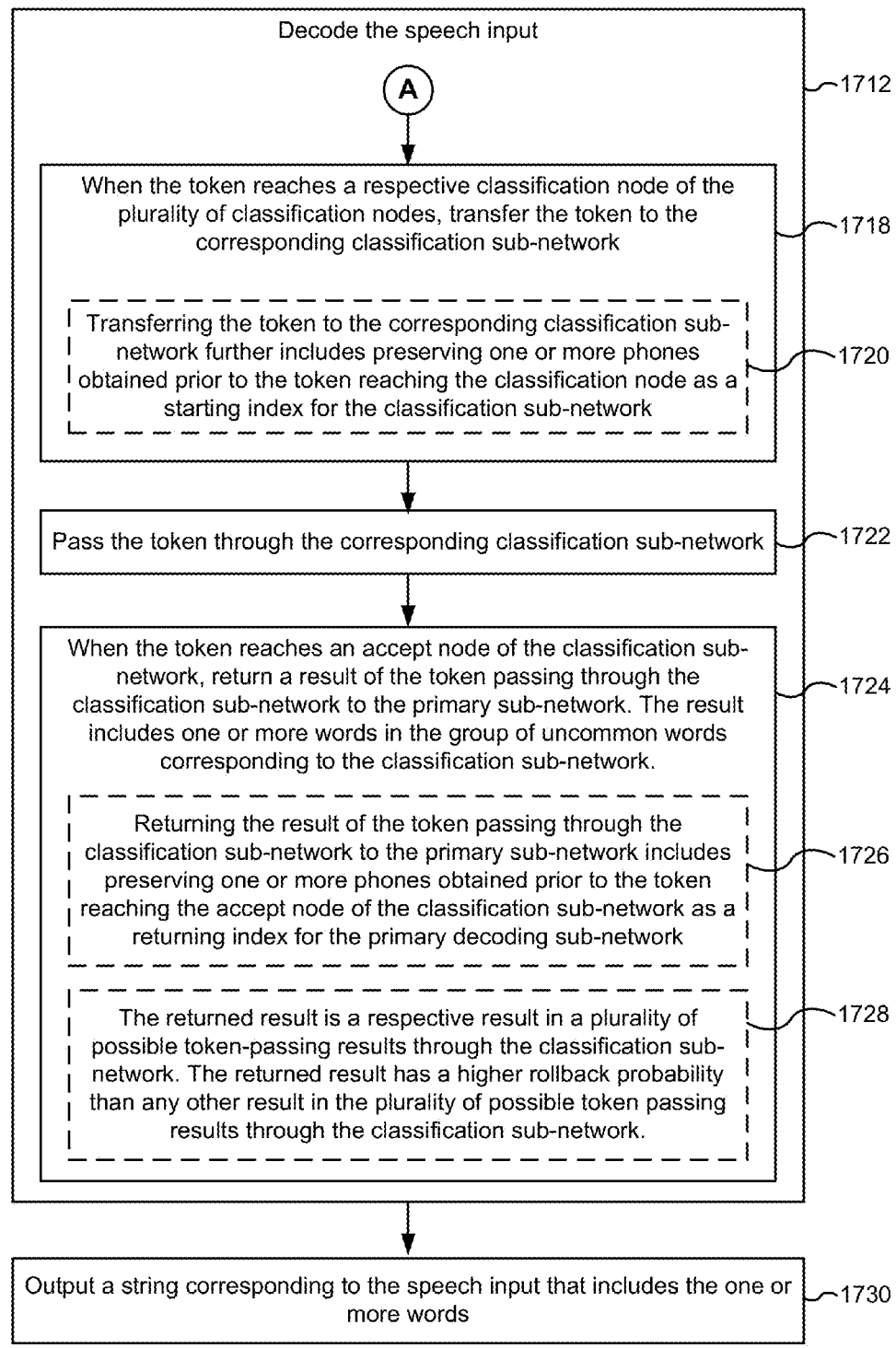

FIGS. 17A and 17B are schematic flowcharts of a method 1700 for recognizing speech commands, in accordance with some implementations. In some implementations, one or more of the operations described with reference to the method 1700 are performed at a device (e.g., device 1808/1810, FIG. 18). In some implementations, one or more of the operations described with reference to the method 1700 are performed at a server system (e.g., speech recognition server system 1811, FIG. 18). For ease of explanation, the method 1700 is described with reference to a device.

The method 1700 includes generating (1702) a decoding network for decoding speech input. The decoding network includes a primary sub-network and one or more classification sub-networks. The primary sub-network includes (1704) a plurality of classification nodes, each classification node corresponding to a respective classification sub-network of the one or more classification sub-networks. Furthermore, each classification sub-network of the one or more classification sub-networks corresponds to a group of uncommon words.

In some embodiments, the decoding network is (1706) a weighted finite state transducer.

In some embodiments, the one or more classification sub-networks include (1708) a medical terminology sub-network, a personal names sub-network, a place names sub-network, and a computer terminology sub-network.

The method 1700 further includes receiving (1710) a speech input. The speech input is decoded (1712) by instantiating (1714) a token corresponding to the speech input in the primary sub-network and passing (1716) the token through the primary network. When the token reaches a respective classification node of the plurality of classification nodes, decoding the speech input further includes transferring (1718) the token to the corresponding classification sub-network. In some embodiments, transferring the token to the corresponding classification sub-network further includes (1720) preserving one or more phones obtained prior to the token reaching the classification node as a starting index for the classification sub-network.

Decoding the speech input further includes passing (1722) the token through the corresponding classification sub-network. When the token reaches an accept node of the classification sub-network, decoding the speech input further includes returning (1724) a result of the token passing through the classification sub-network to the primary sub-network. The result includes one or more words in the group of uncommon words corresponding to the classification sub-network. In some implementations, returning the result of the token passing through the classification sub-network to the primary sub-network includes (1726) preserving one or more phones obtained prior to the token reaching the accept node of the classification sub-network as a returning index for the primary decoding sub-network. In some embodiments, the returned result is (1728) a respective result in a plurality of possible token-passing results through the classification sub-network. The returned result has a higher rollback probability than any other result in the plurality of possible token passing results through the classification sub-network.

Finally, the method 1700 further includes outputting (1730) a string corresponding to the speech input that includes the one or more words.

Figure 1:
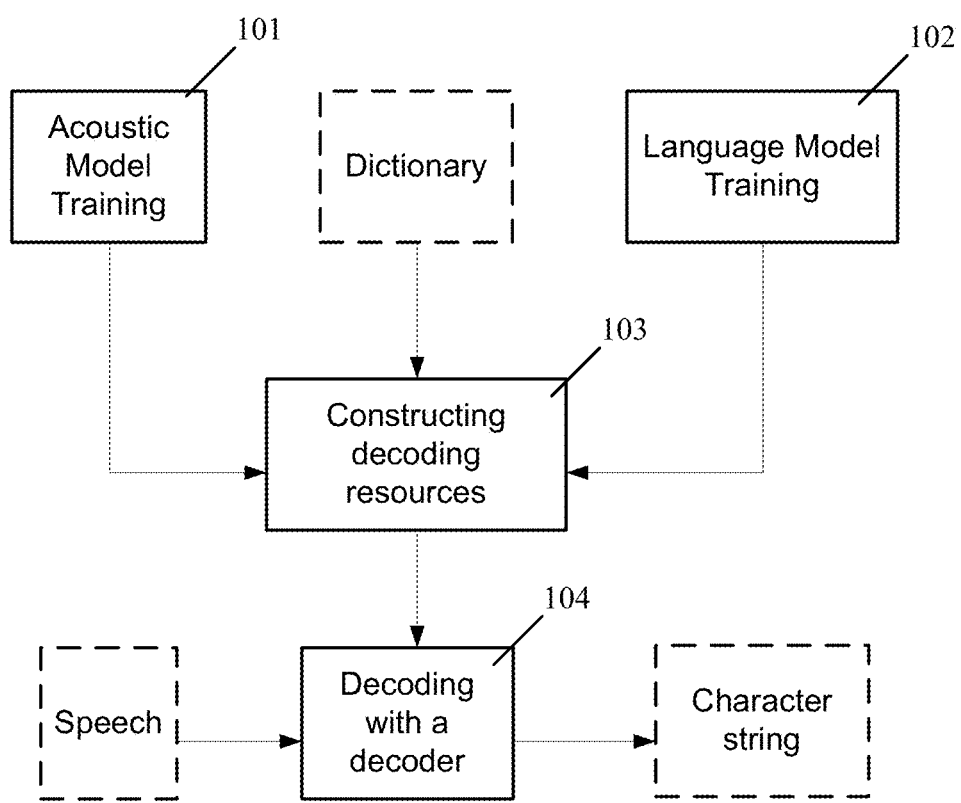
FIG. 1 is a schematic diagram of a processing flow used in some conventional automatic speech recognition systems.
Figure 2:
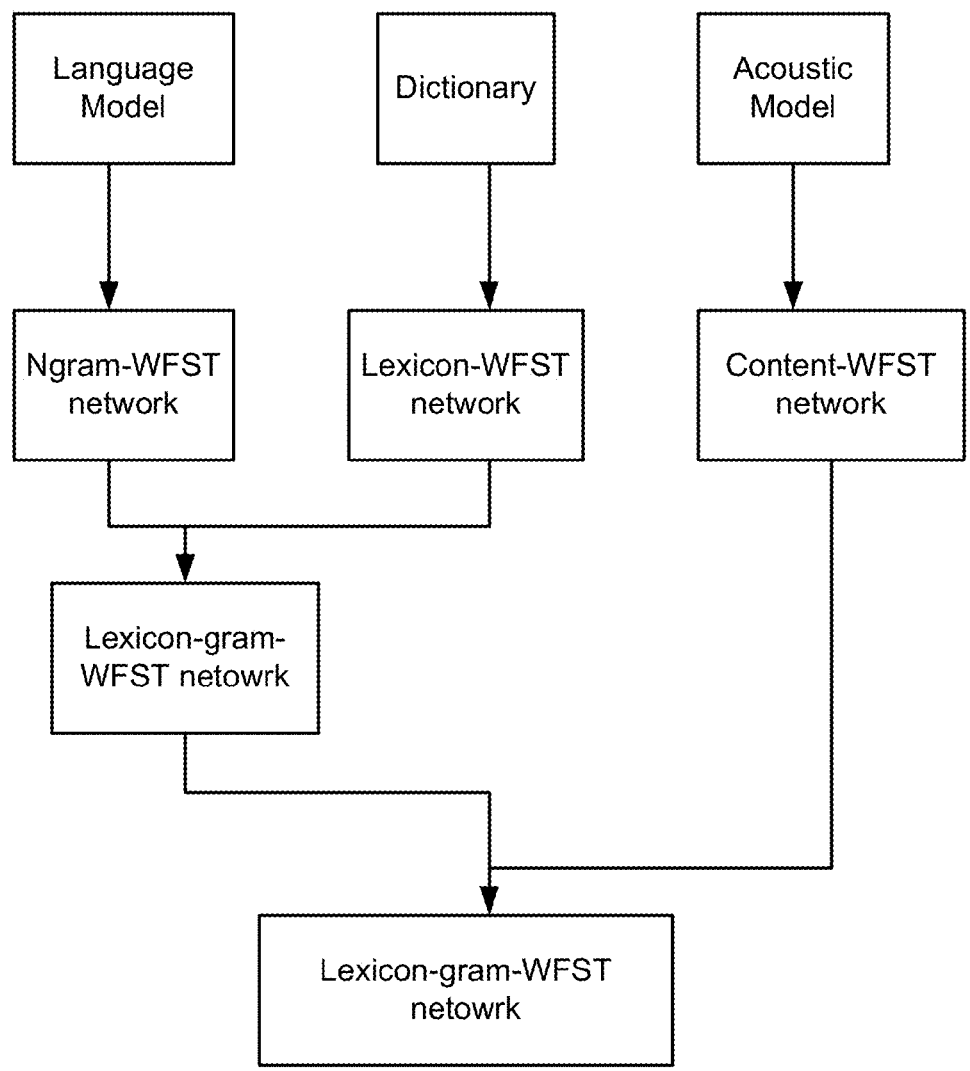
FIG. 2 is a flowchart diagram for construction of a decoding resource network used in some conventional automatic speech recognition systems.

It should be understood that the particular order in which the operations in FIG. 1 have been described is merely exemplary and is not intended to indicate that the described order is the only order in which the operations could be performed. One of ordinary skill in the art would recognize various ways to reorder the operations described herein.

Figure 18:
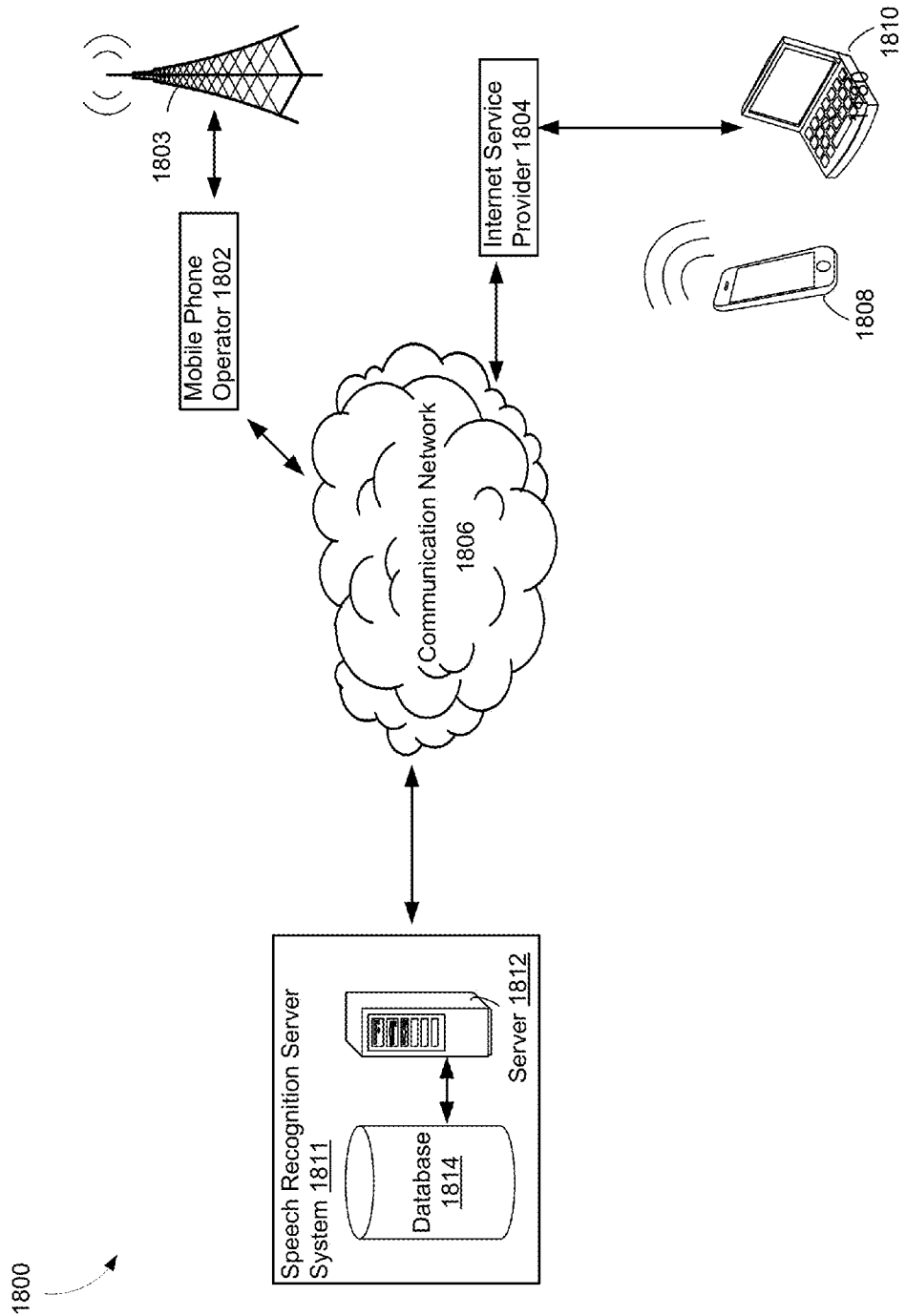
FIG. 18 is a diagram of a client-server environment for speech command recognition, in accordance with some implementations.

FIG. 18 is a diagram of a client-server environment 1800 for speech command recognition, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 1800 includes one or more mobile phone operators 1802, one or more internet service providers 1804, and a communications network 1806.

The mobile phone operator 1802 (e.g., wireless carrier), and the Internet service provider 1804 are capable of being connected to the communication network 1806 in order to exchange information with one another and/or other devices and systems. Additionally, the mobile phone operator 1802 and the Internet service provider 1804 are operable to connect client devices to the communication network 1806 as well. For example, a smart phone 1808 is operable with the network of the mobile phone operator 1802, which includes for example, a base station 1803. Similarly, for example, a laptop computer 1810 (or tablet, desktop, smart television, workstation or the like) is connectable to the network provided by an Internet service provider 1804, which is ultimately connectable to the communication network 1806.

The communication network 1806 may be any combination of wired and wireless local area network (LAN) and/or wide area network (WAN), such as an intranet, an extranet, including a portion of the Internet. It is sufficient that the communication network 1806 provides communication capability between client devices (e.g., smart phones 1808 and personal computers 1810) and servers. In some implementations, the communication network 1806 uses the HyperText Transport Protocol (HTTP) to transport information using the Transmission Control Protocol/Internet Protocol (TCP/IP). HTTP permits a client device to access various resources available via the communication network 1806. However, the various implementations described herein are not limited to the use of any particular protocol.

In some implementations, the client-server environment 1800 further includes a speech recognition server system 1811. Within the speech recognition server system 1811, there is a server computer 1812 (e.g., a network server such as a web server) for receiving and processing data received from the client device 1808/1810 (e.g., speech data). In some implementations, the speech recognition server system 1811 stores (e.g., in a database 1814) and maintains information corresponding to a plurality of acoustic models, language models, grammatical models, and the like (e.g., any of the models ore dictionaries shown in FIG. 3, as well as any of the constructed networks and sub-networks).

In some implementations, the speech recognition server system 1811 generates a decoding network for decoding speech input and stores the decoding network in the database 1814. The decoding network includes a primary sub-network and one or more classification sub-networks. The primary sub-network includes a plurality of classification nodes. Each classification node corresponds to a respective classification sub-network of the one or more classification sub-networks, and each classification sub-network of the one or more classification sub-networks corresponds to a group of uncommon words (such as medical terminology, computer terminology, place names, and/or personal names). The speech recognition system receives a speech input, for example, from a client device 1808/1810 and decodes the speech input by instantiating a token corresponding to the speech input in the primary sub-network. The token is passed through the primary network, and when the token reaches a respective classification node of the plurality of classification nodes, the token is transferred to the corresponding classification sub-network. The speech recognition server system 1811 then passes the token through the corresponding classification sub-network. When the token reaches an accept node of the classification sub-network, the result of the token passing through the classification sub-network is returned to the primary sub-network. The result includes one or more words in the group of uncommon words corresponding to the classification sub-network. Finally, speech recognition server system 1811 outputs (e.g., to back to the client device 1808/1810) a string corresponding to the speech input that includes the one or more words.

Those skilled in the art will appreciate from the present disclosure that any number of such devices and/or systems may be provided in a client-server environment, and particular devices may be altogether absent. In other words, the client-server environment 1800 is merely an example provided to discuss more pertinent features of the present disclosure. Additional server systems, such as domain name servers and client distribution networks may be present in the client-server environment 1800, but have been omitted for ease of explanation.

Figure 19:
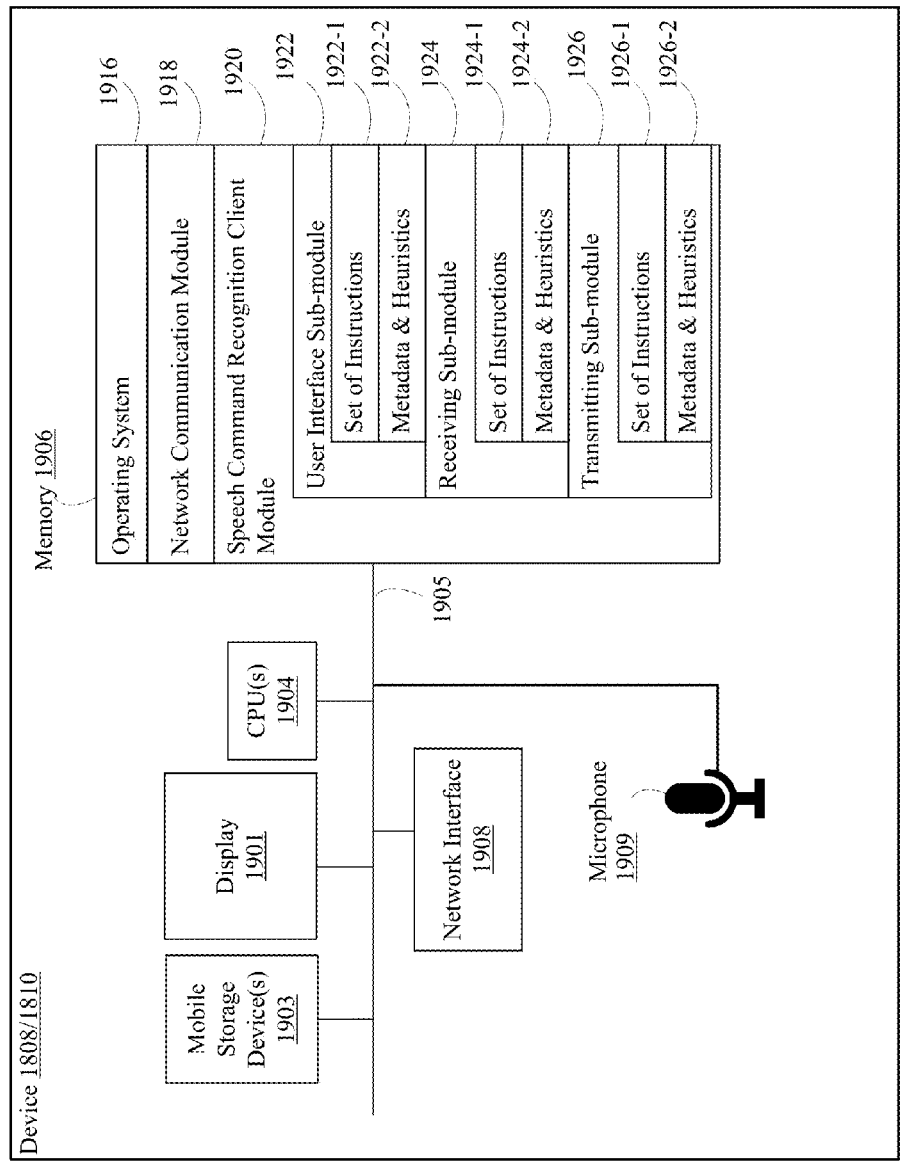
FIG. 19 is a block diagram illustrating a speech command recognition server system, in accordance with some implementations.

FIG. 19 is a diagram of an example implementation of the device 1808/1810 for speech command recognition, in accordance with some implementations. While certain specific features are illustrated, those skilled in the art will appreciate from the present disclosure that various other features have not been illustrated for the sake of brevity and so as not to obscure more pertinent aspects of the implementations disclosed herein.

To that end, the device 1808/1810 includes one or more processing units (CPU's) 1904, one or more network or other communications interfaces 1908, a display 1901, memory 1906, a microphone 1909, one or more mobile storage devices 1903, and one or more communication buses 1905 for interconnecting these and various other components. The communication buses 1905 may include circuitry (sometimes called a chipset) that interconnects and controls communications between system components. Memory 1906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1906 may optionally include one or more storage devices remotely located from the CPU(s) 1904. Memory 1906, including the non-volatile and volatile memory device(s) within memory 1906, comprises a non-transitory computer readable storage medium.

In some implementations, memory 1906 or the non-transitory computer readable storage medium of memory 1906 stores the following programs, modules and data structures, or a subset thereof including an operating system 1916, a network communication module 1918, and a speech recognition client module 1920.

The operating system 1916 includes procedures for handling various basic system services and for performing hardware dependent tasks.

The network communication module 1918 facilitates communication with other devices via the one or more communication network interfaces 1908 (wired or wireless) and one or more communication networks, such as the internet, other wide area networks, local area networks, metropolitan area networks, and so on.

In some implementations, the speech command recognition client module 1920 includes a user interface sub-module 1922 for speech command recognition (e.g., a user activates a predefined affordance to bring up a speech command recognition user interface). To this end, the user interface sub-module includes a set of instructions 1922-1 (e.g., for displaying a user interface on the display 1901, receiving user inputs, etc.) and, optionally, metadata 1922-2. In some implementations, the speech command recognition client module 1920 includes a receiving sub-module 1924 having a set of instructions 1924-1 (e.g., for interfacing with the microphone 1909 to receive a speech input) and, optionally, metadata 1924-2, as well as a transmitting sub-module 1926 having a set of instructions 1926-1 (e.g., for interfacing with the network interface 1908 to transmit the speech input to a sound recognition server system 1811) and, optionally, metadata 1926-2.

Figure 20:
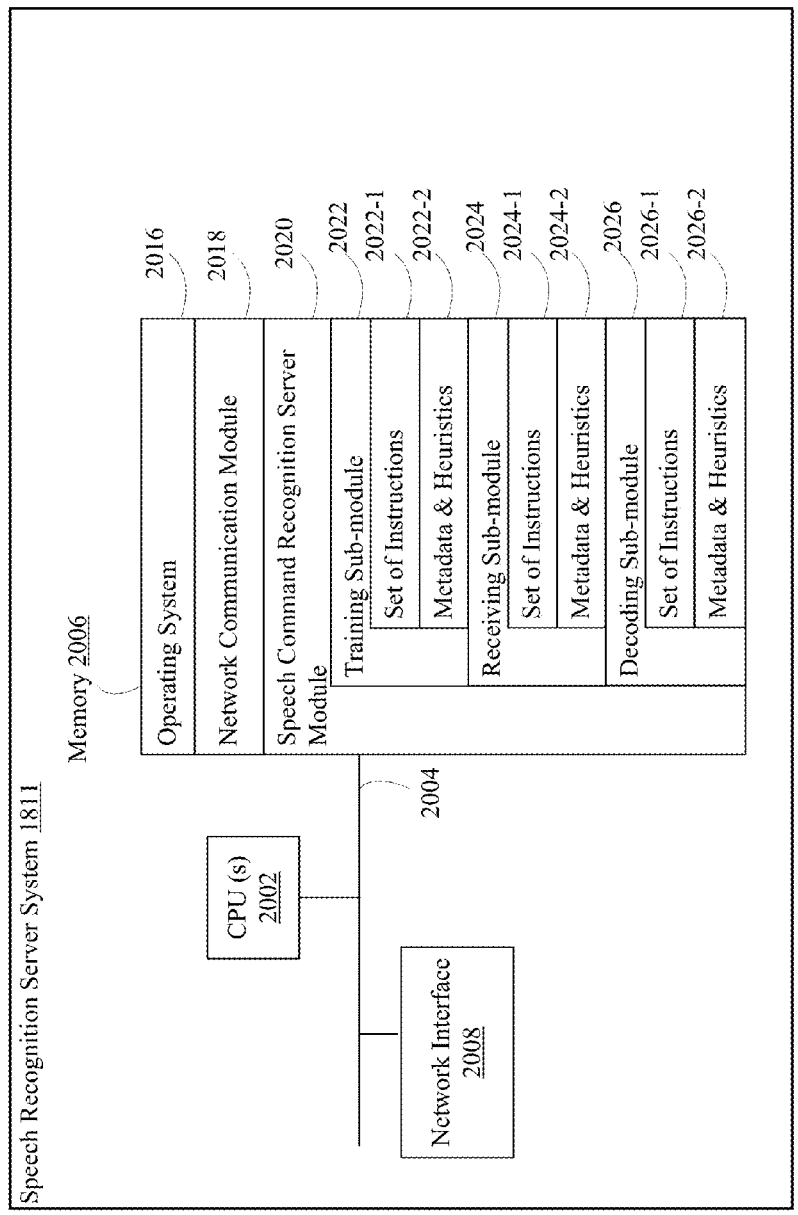
FIG. 20 is a block diagram illustrating a client device, in accordance with some implementations.

FIG. 20 is a block diagram illustrating a speech recognition server system 1811, discussed above with reference to FIG. 18, in accordance with some implementations. While certain specific features are illustrated, those skilled in the art will appreciate from the present disclosure that various other features have not been illustrated for the sake of brevity and so as not to obscure more pertinent aspects of the implementations disclosed herein.

To that end, the speech recognition server system 1811 includes one or more processing units (CPU's) 2002, one or more network or other communications interfaces 2008, memory 2006, and one or more communication buses 2004 for interconnecting these and various other components. The communication buses 2004 may include circuitry (sometimes called a chipset) that interconnects and controls communications between system components. Memory 2006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 2006 may optionally include one or more storage devices remotely located from the CPU(s) 2002. Memory 2006, including the non-volatile and volatile memory device(s) within memory 2006, comprises a non-transitory computer readable storage medium.

In some implementations, memory 2006 or the non-transitory computer readable storage medium of memory 2006 stores the following programs, modules and data structures, or a subset thereof including an operating system 2016, a network communication module 2018, a speech command recognition server module 2020.

The operating system 2016 includes procedures for handling various basic system services and for performing hardware dependent tasks.

The network communication module 2018 facilitates communication with other devices (e.g., other speech recognition server system 1811 as well as client devices 1808/1810) via the one or more communication network interfaces 2008 (wired or wireless) and one or more communication networks, such as the Internet, other wide area networks, local area networks, metropolitan area networks, and so on.

The speech command recognition module server 2020 is configured to receive sound samples, train acoustic models, and decode sample samples. To that end, the speech command recognition server module 2020 optionally includes one or more sub-modules, each including a set of instructions and optionally including metadata. For example, in some implementations, the speech command recognition server module 2020 receives sound samples from a client 1808/1810 using a receiving sub-module 2024 (which includes a set of instructions 2024-1 and metadata 2024-2), trains the acoustic models with the received sound samples using a training sub-module 2022 (which includes a set of instructions 2022-1 and metadata 2022-2) and decodes subsequent sound samples using a decoding sub-module 2026 (which includes a set of instructions 2026-1 and metadata 2026-2) As an example of metadata, in some implementations, the metadata 2010-1 includes language settings corresponding to respective users, effectiveness ratings provided by the respective users, etc.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of recognizing speech, comprising:
generating a decoding network for decoding speech input, the decoding network comprising a primary sub-network and one or more classification sub-networks, wherein:
the primary sub-network includes a plurality of classification nodes, each classification node corresponding to a respective classification sub-network of the one or more classification sub-networks, wherein each respective classification sub-network is distinct from the primary sub-network; and
each classification sub-network of the one or more classification sub-networks corresponds to a group of uncommon words;
receiving a speech input; and
decoding the speech input by:
instantiating a token corresponding to the speech input in the primary sub-network;
passing the token through the primary sub-network;
when the token reaches a respective classification node of the plurality of classification nodes, transferring the token to the corresponding classification sub-network;
passing the token through the corresponding classification sub-network;
when the token reaches an accept node of the classification sub-network, returning a result of the token passing through the classification sub-network to the primary sub-network, wherein the result includes one or more words in the group of uncommon words corresponding to the classification sub-network;
outputting a string corresponding to the speech input that includes the one or more words.

2. The method of claim 1, wherein the returned result is a respective result in a plurality of possible token-passing results through the classification sub-network, the returned result having a higher rollback probability than any other result in the plurality of possible token passing results through the classification sub-network.

3. The method of claim 1, wherein:
transferring the token to the corresponding classification sub-network further includes preserving one or more phones obtained prior to the token reaching the classification node as a starting index for the classification sub-network; and
returning the result of the token passing through the classification sub-network to the primary sub-network includes preserving one or more phones obtained prior to the token reaching the accept node of the classification sub-network as a returning index for the primary decoding sub-network.

4. The method of claim 1, wherein the decoding network is a weighted finite state transducer.

5. The method of claim 1, wherein the one or more classification sub-networks include a medical terminology sub-network, a personal names sub-network, a place names sub-network, and a computer terminology sub-network.

6. An electronic device, comprising:
one or more processors;
memory; and
one or more programs, wherein the one or more programs are stored in memory and configured to be executed by the one or more processors, the one or more programs including an operating system and instructions that when executed by the one or more processors cause the electronic device to:
generate a decoding network for decoding speech input, the decoding network comprising a primary sub-network and one or more classification sub-networks, wherein:
the primary sub-network includes a plurality of classification nodes, each classification node corresponding to a respective classification sub-network of the one or more classification sub-networks, wherein each respective classification sub-network is distinct from the primary sub-network; and
each classification sub-network of the one or more classification sub-networks corresponds to a group of uncommon words;
receive a speech input; and
decode the speech input by:
instantiating a token corresponding to the speech input in the primary sub-network;
passing the token through the primary sub-network;
when the token reaches a respective classification node of the plurality of classification nodes, transferring the token to the corresponding classification sub-network;
passing the token through the corresponding classification sub-network;
when the token reaches an accept node of the classification sub-network, returning a result of the token passing through the classification sub-network to the primary sub-network, wherein the result includes one or more words in the group of uncommon words corresponding to the classification sub-networks;
output a string corresponding to the speech input that includes the one or more words.

7. The electronic device of claim 6, wherein the returned result is a respective result in a plurality of possible token-passing results through the classification sub-network, the returned result having a higher rollback probability than any other result in the plurality of possible token passing results through the classification sub-network.

8. The electronic device of claim 6, wherein:
transferring the token to the corresponding classification sub-network further includes preserving one or more phones obtained prior to the token reaching the classification node as a starting index for the classification sub-network; and
returning the result of the token passing through the classification sub-network to the primary sub-network includes preserving one or more phones obtained prior to the token reaching the accept node of the classification sub-network as a returning index for the primary decoding sub-network.

9. The electronic device of claim 6, wherein the decoding network is a weighted finite state transducer.

10. The electronic device of claim 6, wherein the one or more classification sub-networks include a medical terminology sub-network, a personal names sub-network, a place names sub-network, and a computer terminology sub-network.

11. A non-transitory computer readable storage medium storing one or more programs, the one or more programs comprising instructions, which when executed by an electronic device with one or more processors and memory, cause the electronic device to:
generate a decoding network for decoding speech input, the decoding network comprising a primary sub-network and one or more classification sub-networks, wherein:
the primary sub-network includes a plurality of classification nodes, each classification node corresponding to a respective classification sub-network of the one or more classification sub-networks, wherein each respective classification sub-network is distinct from the primary sub-network; and
each classification sub-network of the one or more classification sub-networks corresponds to a group of uncommon words;
receive a speech input; and
decode the speech input by:
instantiating a token corresponding to the speech input in the primary sub-network;
passing the token through the primary sub-network;
when the token reaches a respective classification node of the plurality of classification nodes, transferring the token to the corresponding classification sub-network;
passing the token through the corresponding classification sub-network;
when the token reaches an accept node of the classification sub-network, returning a result of the token passing through the classification sub-network to the primary sub-network, wherein the result includes one or more words in the group of uncommon words corresponding to the classification sub-network;
output a string corresponding to the speech input that includes the one or more words.

12. The non-transitory computer readable storage medium of claim 11, wherein the returned result is a respective result in a plurality of possible token-passing results through the classification sub-network, the returned result having a higher rollback probability than any other result in the plurality of possible token passing results through the classification sub-network.

13. The non-transitory computer readable storage medium of claim 11, wherein:
transferring the token to the corresponding classification sub-network further includes preserving one or more phones obtained prior to the token reaching the classification node as a starting index for the classification sub-network; and
returning the result of the token passing through the classification sub-network to the primary sub-network includes preserving one or more phones obtained prior to the token reaching the accept node of the classification sub-network as a returning index for the primary decoding sub-network.

14. The non-transitory computer readable storage medium of claim 11, wherein the decoding network is a weighted finite state transducer.

15. The non-transitory computer readable storage medium of claim 11, wherein the one or more classification sub-networks include a medical terminology sub-network, a personal names sub-network, a place names sub-network, and a computer terminology sub-network.

* * * * *